May 12, 1959

D. R. CONKLING ET AL 2,885,789

APPARATUS FOR DRYING FABRICS

Filed Sept. 28, 1955

INVENTOR.
Donald R. Conkling
Edgar S. Stoddard
BY
Smith, Olsen, Baird & Miller,
Attys.

May 12, 1959   D. R. CONKLING ET AL   2,885,789
APPARATUS FOR DRYING FABRICS
Filed Sept. 28, 1955   5 Sheets-Sheet 2

INVENTOR.
Donald R. Conkling
BY Edgar S. Stoddard
Smith, Olser, Baird & Miller,
Attys.

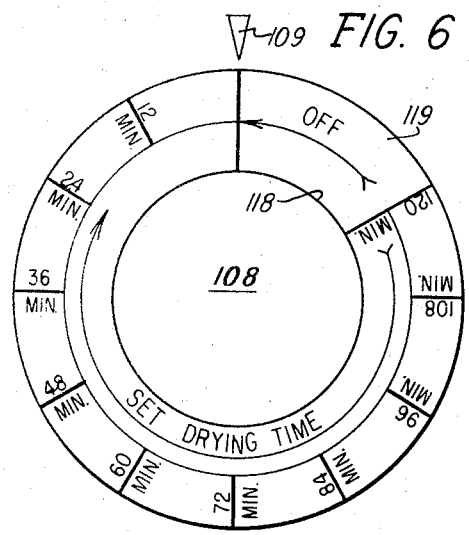
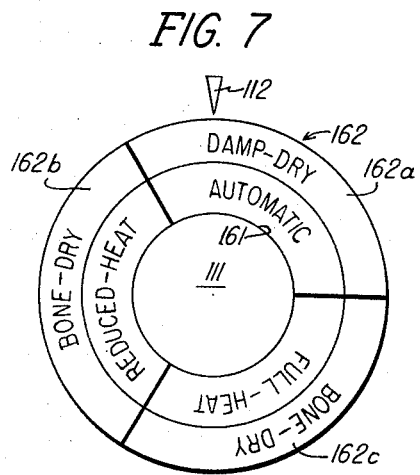
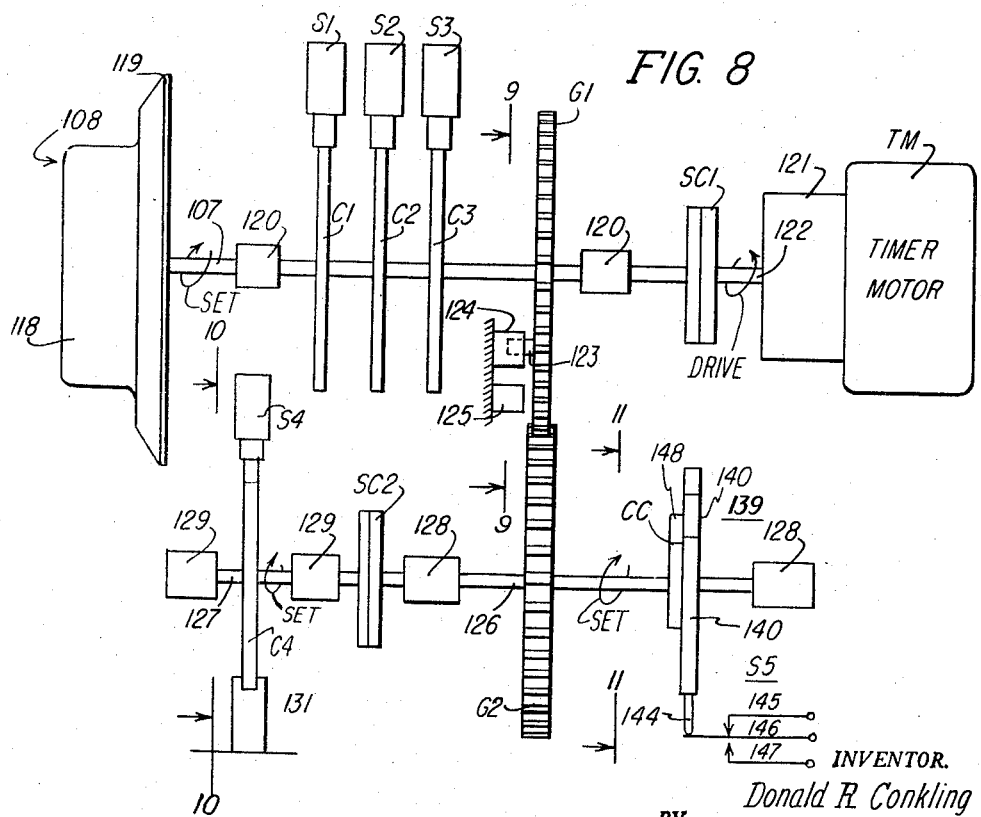

May 12, 1959  D. R. CONKLING ET AL  2,885,789
APPARATUS FOR DRYING FABRICS
Filed Sept. 28, 1955   5 Sheets-Sheet 4

INVENTOR.
Donald R. Conkling
BY Edgar S. Stoddard
Smith, Olsen, Baird & Miller,
Attys.

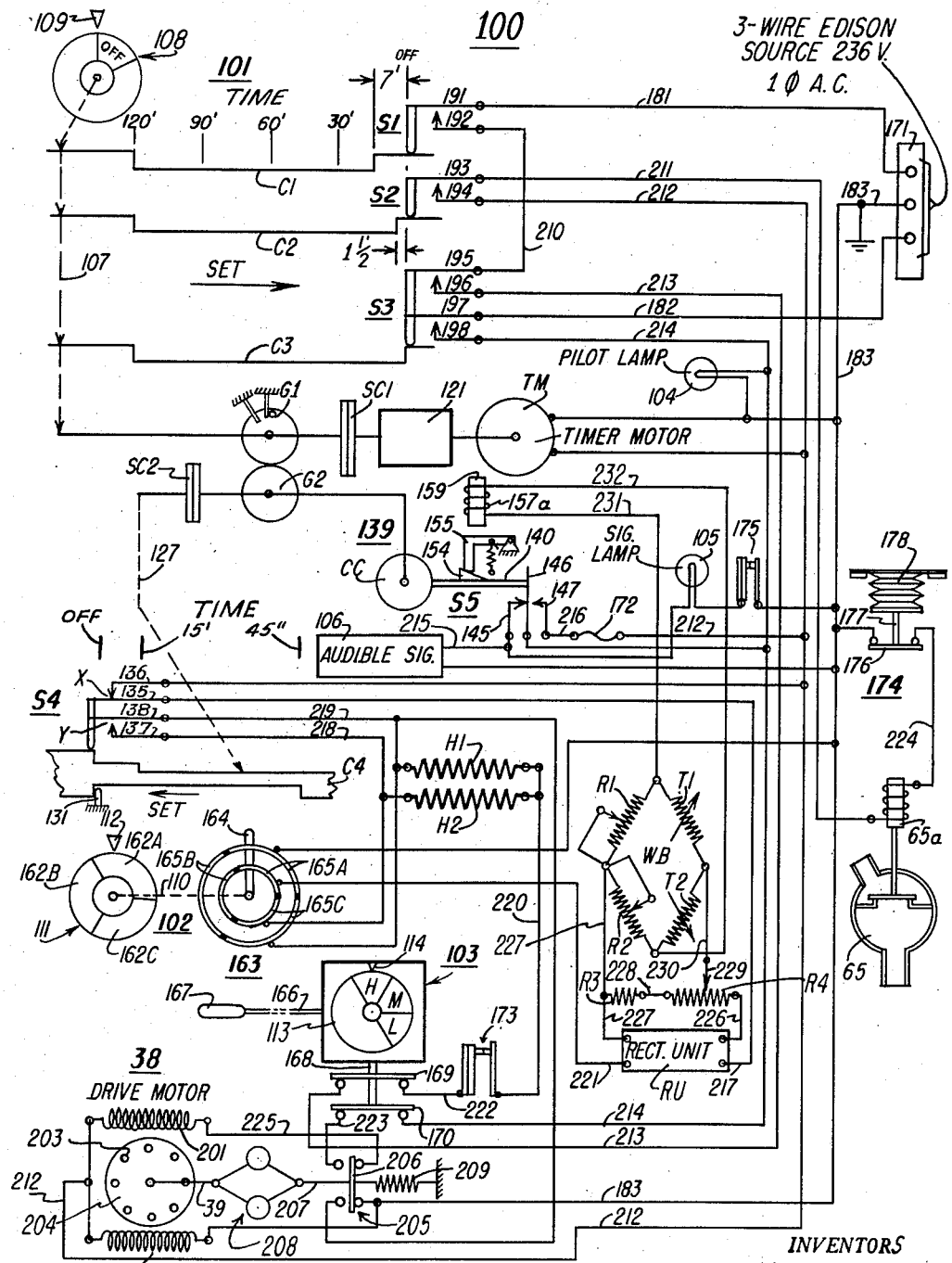

United States Patent Office 2,885,789
Patented May 12, 1959

2,885,789
APPARATUS FOR DRYING FABRICS

Donald R. Conkling, Wheaton, and Edgar S. Stoddard, Berwyn, Ill., assignors to General Electric Company, a corporation of New York Application September 28, 1955, Serial No. 537,212

34 Claims. (Cl. 34—45)

The present invention relates to apparatus for drying fabrics, or the like, and more particularly to clothes drying machines of the home laundry type.

In a clothes drying machine of the home laundry type, it is desirable to dry towels, etc., to a bone-dry condition carrying substantially no moisture, since these laundry items are not ordinarily ironed before re-use, while it is desirable to dry sheets, etc., to a damp-dry condition carrying a small amount of residual moisture since these laundry items are ordinarily ironed before re-use and may be more readily ironed in a damp-dry condition.

In the operation of a conventional drying machine of the home laundry type, the control of the drying of the fabrics is established by the operator in terms of temperature (high, medium or low) of operation of the machine and in terms of time (minutes) of operation of the machine; whereby it is necessary for the operator to estimate the required operation of the machine in terms of these two controls, notwithstanding a great number of variable factors, including the weight of the load of fabrics, the character thereof with reference to the retention of moisture, the total amount of water initially carried thereby, etc. While presetting a long drying time of operation of the machine will insure a bone-dry condition of the fabrics, there is really no way to preset the operation thereof in order to insure a damp-dry condition of the fabrics; whereby the matter of obtaining a damp-dry condition of the fabrics is entirely guesswork on the part of the operator.

Accordingly it is a general object of the present invention to provide in apparatus for drying fabrics, or the like, automatic control equipment that positively insures the required control of the machine to obtain a damp-dry condition of a load of fabrics, without knowledge on the part of the operator of the many variable factors that actually determine the required drying time thereof; whereby the operation of the machine is altogether automatic after presetting thereof by the operator.

Another object of the invention is to provide in a clothes drying machine, an improved automatic control circuit arrangement that permits of great flexibility in presetting thereof to carry out drying operations under a great variety of actual drying conditions in order to obtain the desired condition of dryness of the clothes at the conclusion of operation of the machine.

A further object of the invention is to provide an automatic clothes drying machine of improved and simplified construction and arrangement that accommodates presetting of the desired condition of dryness of the clothes at the conclusion of the operating cycle thereof and that incorporates facilities for controlling the operating cycle of the machine in accordance with the preset desired condition of dryness of the clothes.

Further features of the invention pertain to the particular arrangement of the elements of the clothes drying machine, whereby the above-outlined and additional operating features thereof are attained.

The invention, both as to its organization and method of operation, together with further objects and advantages thereof, will best be understood by reference to the following specification taken in connection with the accompanying drawings, in which:

Fig. 6 is a greatly enlarged plan view of a manually operable time control dial incorporated in the machine;

Fig. 7 is a greatly enlarged plan view of a manually operable cycle control dial incorporated in the machine;

Fig. 8 is a greatly enlarged side elevational view of a program controller incorporated in the machine;

Fig. 13 is an electric diagram of the automatic control circuit that is incorporated in the machine.

Figure 1:
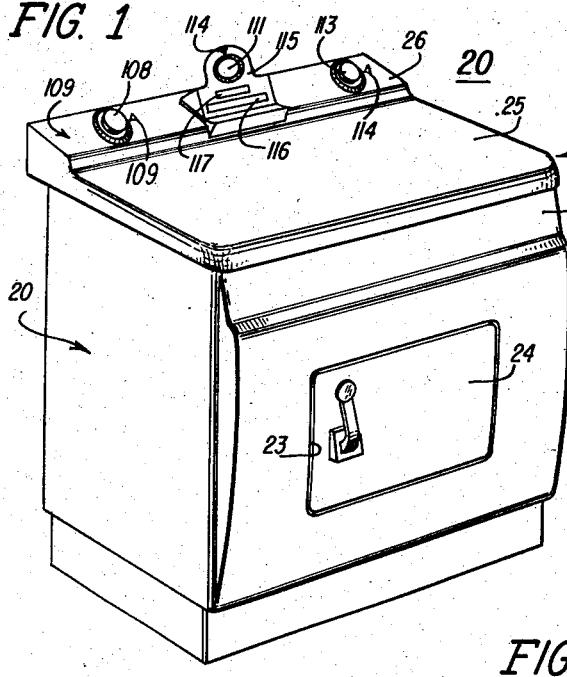
Figure 1 is a front perspective view of a clothes drying machine of the home laundry type embodying the present invention.

Before proceeding with the description of the structural embodiment of the drying apparatus of the present invention, it is first noted that the present invention is predicated upon the discoveries that in drying fabrics in a clothes drying machine of the home laundry type there exist peculiar relationships between time and the temperature of the hot air in contact with the tumbling fabrics and between time and the actual temperature of the tumbling fabrics, as time proceeds following initiation of operation of the machine, that in these relationships there is a marked transition as the fabrics pass from a wet condition through a damp-dry condition into a bone-dry condition, and that this transition in the relationships may be greatly amplified or accentuated for control purposes by employing a relatively low temperature (about 115° F.) of the hot air in contact with the tumbling fabrics at this transition. In the machine embodying the present invention, the air in contact with the tumbling fabrics is employed at a relatively high temperature (about 160° F.) during a fixed time interval (about 30 minutes) at the beginning of the drying cycle, then the temperature thereof is reduced to the relatively low temperature mentioned so that the transition occurs at a time when the air in contact with the tumbling fabrics is at the relatively low temperature. This arrangement of the steps in the machine is very advantageous as it does not bring about any substantial increase in the overall drying time of the fabrics, while it effects a very substantial emphasis of the temperature changes that occur at this transition. More particularly, in the machine, the temperature of the air in contact with the fabrics is well above that of the tumbling fabrics until this transition takes place, and whereat the temperature difference is quite small. In fact, the temperature difference is substantially a minimum at this transition; whereby this small temperature difference representing a unique phenomenon at this transition is employed for the purpose of arresting operation of the machine when the tumbling fabrics therein are thus in the corresponding damp-dry condition.

Referring now to Figs. 1 to 5, inclusive, of the drawings, the clothes drying machine 20 there illustrated and embodying the features of the present invention is of the home laundry type and of the general construction and arrangement of that disclosed in U. S. Patent No. 2,701,421, granted on February 8, 1955 to Clifford E. Erickson and Glenn D. Graham. More particularly, the machine 20 is of the enclosed water-spray-condenser type and comprises a cabinet 21 including a front wall 22 having a front access opening 23 therein provided with a front door 24, and a top wall 25 terminating adjacent to the rear thereof in an upwardly directed backsplash 26. Housed within the cabinet 21 is a casing 27 including a substantially tubular side wall 28, and a front wall 29 having a front access opening 30 therein registering with the cabinet front access opening 23. Enclosed within the casing 27 is a drum 31 including a substantially cylindrical perforated side wall 32 and a front wall 33 having a front access opening 34 therein registering with the casing front access opening 30 and the cabinet access opening 23.

Figure 4:
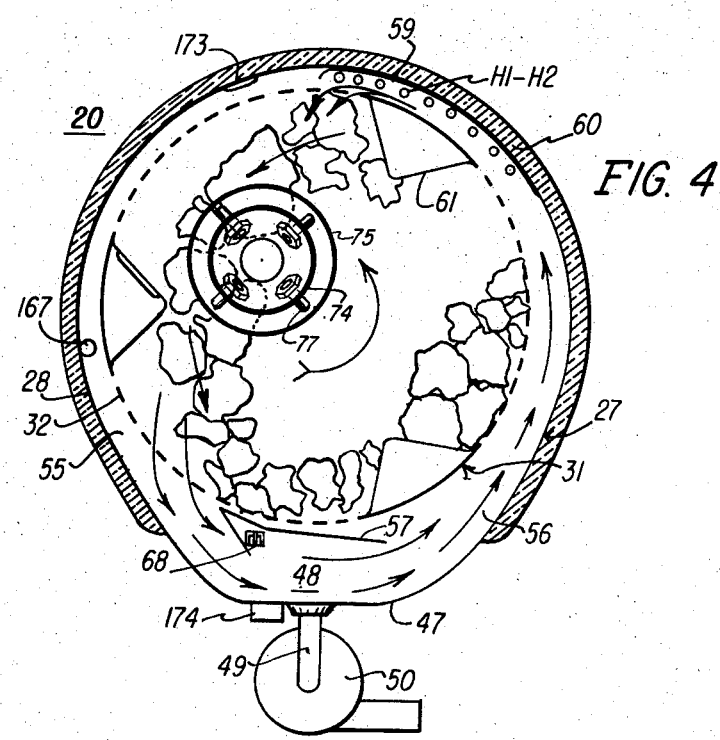
Figs. 4 and 5 are respectively a transverse vertical sectional view and a fragmentary longitudinal sectional view of the machine, largely schematic, and illustrating the general principle of operation thereof.
Figure 5:
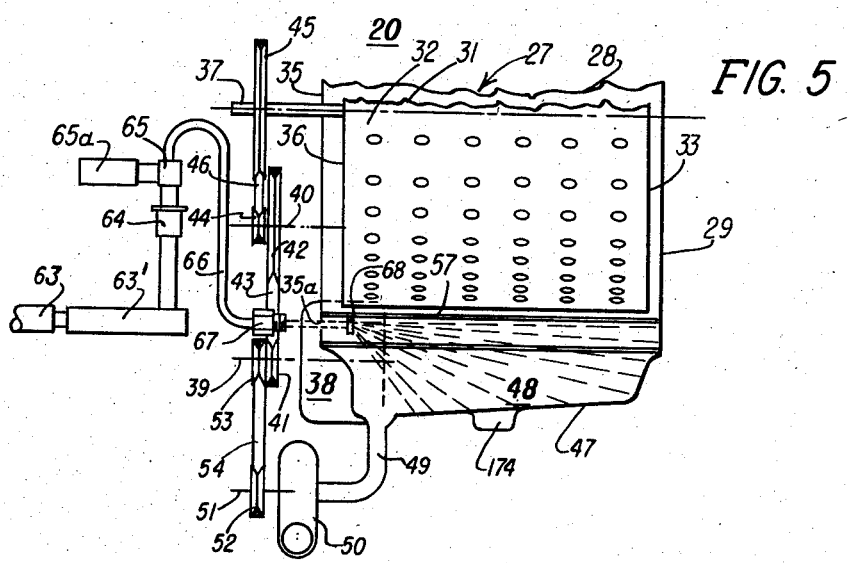

As indicated in Figs. 4 and 5, the casing 27 and the drum 31 are respectively provided with adjacent rear walls 35 and 36, and the drum 31 is mounted for rotation about a substantially horizontal axis upon a drum shaft 37, the drum shaft 37 being suitably secured to the drum rear wall 36 and projecting through a suitable opening provided in the casing rear wall 35. Specifically, the arrangement for rotating the drum 31 also includes an electric drive motor 38 provided with an operating shaft 39, as well as an idler shaft 40. The operating shaft 39 carries a V-pulley 41 that drives a V-pulley 42 carried by the idler shaft 40 through a cooperating V-belt 43; and the idler shaft 40 also carries a V-pulley 44 that drives a V-pulley 45 carried by the drum shaft 37 through a cooperating V-belt 46; whereby the required speed reduction is obtained from the motor shaft 39 to the drum shaft 37. Also the casing 27 is provided with a bottom wall 47 defining a combined condensing chamber and sump 48 disposed below the drum 31, the sump 48 communicating with a drain conduit 49 that is connected to a drain pump 50, the drain pump being provided with an operating shaft 51 carrying a V-pulley 52 that is driven by a V-pulley 53 carried by the motor shaft 39 through a cooperating V-belt 54.

Figure 2:
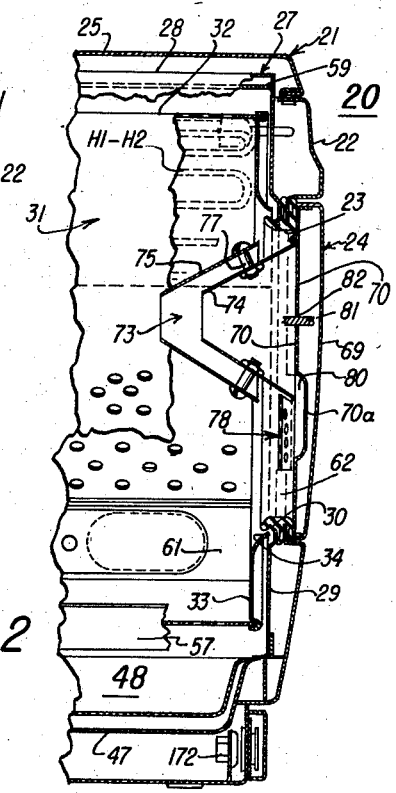
Fig. 2 is an enlarged fragmentary longitudinal vertical sectional view of the front of the machine shown in Fig. 1.

The casing 27 is substantially scroll-shaped and the drum 31 is mounted for rotation in the counterclockwise direction, as viewed from the front of the machine 20, as indicated in Fig. 4, the center line of the drum 31 being offset above and to the left with respect to the center line of the casing 27, thereby to define the tapered passages 55 and 56 between the drum side wall 32 and the casing side wall 28 and respectively communicating with the top left-hand side and the top right-hand side of the condensing chamber 48, a baffle 57 being arranged at the top of the condensing chamber 48 below the bottom of the drum side wall 32. Also a heating unit H1—H2 is arranged in the upper righthand portion of the casing 27 between the casing side wall 28 and the drum side wall 32, a heat reflector 59 being positioned between the casing side wall 28 and the heating unit H1—H2. Moreover, the outer surface of the upper portion of the casing side wall 28 is provided with a suitable layer of heat-insulating material 60; and the outer surface of the upper portion of the casing rear wall 35 is provided with a suitable layer of heat-insulating material, not shown. The drum side wall 32 carries a number of inwardly directed clothes tumbling vanes 61, three being illustrated, that are disposed in angularly spaced-apart relation; and a throat gasket 62 is arranged in the registering front access openings 23, 30 and 34, as shown in Fig. 2. The throat gasket 62 is preferably formed of soft rubber, or the like, and is secured to the cabinet front wall 22 and to the casing front wall 29 within the respective front access openings 23 and 30 and projects into the drum 31 through the corresponding front access opening 34, so as to provide a smooth passage for the clothes when the front door 24 occupies its open position.

Further, the machine 20 comprises a cool water supply system including an inlet conduit 63 that is supplied with cool water under gauge pressure from the city water main, a communicating fixture 63' housing a strainer, not shown, a communicating flow regulator 64, a communicating control valve 65, a communicating tube 66 and a communicating jet nozzle 67. The control valve 65 is of the solenoid controlled type being provided with a solenoid indicated at 65a, the control valve 65 being biased into its closed position and operated into its open position in response to energization of the solenoid 65a. The jet nozzle 67 is arranged rearwardly of the casing rear wall 35 and is disposed in alignment with an opening 35a formed therein and positioned below the baffle 57. Also, a pin or target 68 is arranged below the baffle 57 in the top of the condensing chamber 48 and in alignment with the jet nozzle 67 and the opening 35a. Thus it will be understood, that when the control valve 65 is operated into its open position a stream of cool water is directed by the jet nozzle 67 through the hole 35a formed in the casing rear wall 35 and onto the target 68; whereby the stream of cool water is broken up into a spray of cool water directed longitudinally forwardly in the condensing chamber 48 and substantially completely filling the same for a scrubbing and cooling purpose as explained more fully hereinafter.

Considering now the general mode of operation of the machine 20, the fabrics to be dried are placed in the drum 31, the front door 24 is closed, and operation is initiated; whereby the heating unit H1—H2 is energized, the motor 38 is operated, and the control valve 65 is operated into its open position. Accordingly, the motor 38 rotates the drum 31 and operates the drain pump 50, whereby the fabrics in the drum 31 are tumbled in a general toroidal formation, as indicated in Fig. 4. The rotating drum 31, as well as the tumbling fabrics therein, effect circulation of the air in the counterclockwise direction, as viewed in Fig. 4, from the drum 31 via the passage 55 through the sump 48 via the passage 56 across the heating unit H1—H2, and thence back into the drum 31. The heating unit H1—H2 heats the drum side wall 32, as well as the air circulated thereover; whereby the air is dried and contacts the tumbling clothes effecting heating thereof and the consequent evaporation of moisture therefrom, so that the hot moisture-laden air is conducted into the condensing chamber 48 and subjected to thorough scrubbing by the spray of cool water therein. Hence, lint is scrubbed from the circulated current of air and the moisture therein is condensed therefrom in the condensing chamber 48 before the air is returned via the passage 56 back into contact with the heating unit H1—H2. The water, condensate and lint accumulates in the sump 48 and is delivered via the drain conduit 49 to the drain pump 50 from which it is pumped to the exterior. In view of the foregoing, it will be appreciated that the operation described brings about drying of the tumbling fabrics, the water therein being evaporated therefrom by the hot air, and the moisture being condensed from the circulating air in the condensing chamber 48 by the contact with the spray of cool water produced therein by the target 68 as a consequence of the projection of the stream of water thereonto by the jet nozzle 67.

Figure 3:
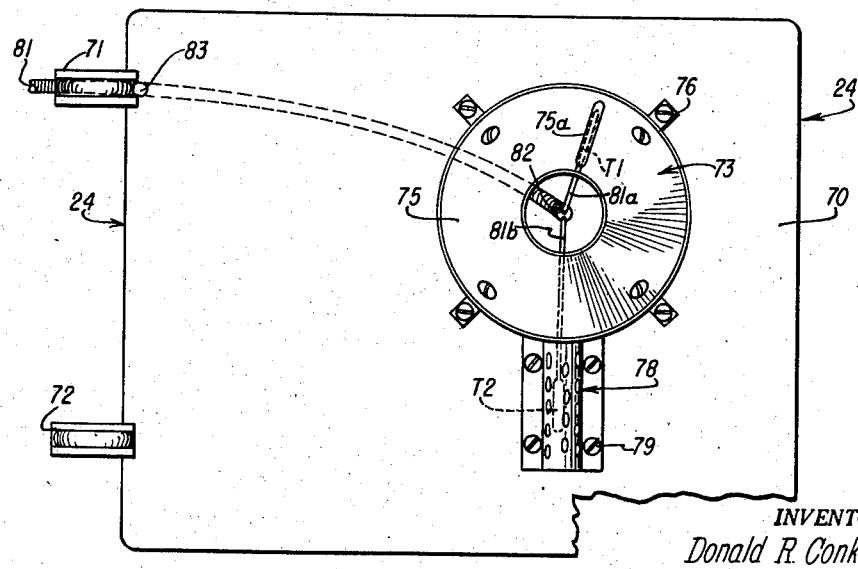
Fig. 3 is a greatly enlarged fragmentary side elevational view of the inside of the front door of the machine in its open position.

Considering now in greater detail the modification of the machine 20 in accordance with the present invention, the front door 24 comprises, as best shown in Figs. 2 and 3, outer and inner walls 69 and 70 of generally rectangular form and arranged in spaced-apart relation; and the front door 24 is mounted for hinged movements between its closed and open positions upon the cabinet front wall 22 by upper and lower hinge elements 71 and 72. The inside surface of the inner wall 70 carries first structure 73 of general frusto-conical form and including corresponding inner and outer elements 74 and 75 arranged in nested spaced-apart relation. More particularly, the base of the inner truncated cone 74 is secured directly to the inside surface of the inner wall 70 by a series of clamps 76, and projects rearwardly therefrom through the drum front access opening 34 into the front of the drum 31; and the base of the truncated outer cone 75 is secured to the underlying intermediate portion of the inner cone 74 by a series of heat-insulating studs 77 and projects rearwardly therefrom further into the front of the drum 31. Accordingly, the outer cone 75 is disposed substantially completely within the front of the drum 31 when the front door 24 occupies its closed position; and at this point, it is noted that the longitudinal center line of the first structure 73 is disposed somewhat above and somewhat to the left of the longitudinal center line of the drum 31, when the door 24 occupies its closed position, as indicated in Fig. 4. Preferably the cones or probes 74 and 75 are formed of sheet stainless steel; and an outwardly directed depression 75a is formed in the outer cone 75 so as to provide a temperature-sensing well therein.

Also the inside surface of the inner wall 70 carries second structure 78 disposed immediately below the first structure 73 and consisting essentially of an upstanding perforated tubular sheet retained in place by a series of screws 79. Thus the sheet 78 is hollow and the upper end thereof communicates with the space disposed between the two cones 74 and 75 of the first structure 73 adjacent to the base of the inner cone 74, and the lower end thereof communicates with the interior of the drum 31 when the door 24 occupies its closed position; and moreover, a forwardly extending depression 70a is formed in the adjacent portion of the inner wall 70 of the front door 24 and arranged to provide a channel 80 placing the interior of the inner cone 74 into communication with the interior of the sheet 78. Preferably the sheet 78 is also formed of stainless steel, the hollow body thereof defining a temperature-sensing well.

In view of the foregoing, it will be understood that the first and second structures 73 and 78 carried by the inside surface of the inner wall 70 of the front door 24 are movable therewith through the registering front openings 23, 30 and 34, as the front door 24 is moved between its closed and open positions; and moreover, when the front door 24 occupies its closed position, the two structures 73 and 70a are effectively disposed within the front of the drum 31. Accordingly, in the operation of the machine 20, the first structure 73 projects into the interior of the general toroidal formation of the tumbling fabrics, as indicated in Fig. 4; whereby the tumbling fabrics adjacent to the front of the drum 31 are in wiping contact with the outer cone 75 effecting good heat exchange therewith, so that the temperature of the outer cone 75 is directly related to the actual temperature of the hot tumbling fabrics. Moreover, the outer cone 75 is formed of sheet stainless steel, as previously noted, so that it has a relatively small thermal mass in order that the temperature thereof closely follows that of the hot tumbling clothes in wiping contact therewith. Also the exterior surface of the outer cone 75 is smooth and the taper thereof is adequate to prevent hanging or winding up of the tumbling clothes thereupon; whereby there is no interference by the first structure 73 with the rotation of the tumbling clothes in the general toroidal formation, as indicated in Fig. 4. Further, the hot air that is circulated through the rotating drum 31 passes through the holes provided in the front ends of the cones 74 and 75 toward the inner wall 70 of the front door 24 and through the passage 80 into the interior of the tubular sheet 78 and is thence returned into the interior of the drum 31. Moreover, the hot air passing forwardly between the two cones 74 and 75 may enter the top end of the tubular sheet 78 and through the perforations provided therein; whereby the interior of the tubular sheet 78 is in the stream of the hot air circulated through the drum 31 into contact with the tumbling fabrics therein.

As indicated in Fig. 3, a first temperature sensing or thermal element T1 is arranged within the well 75a formed in the interior surface of the outer cone 75 and disposed in good heat exchange relation therewith, whereby the temperature of the first thermal element T1 is directly controlled by the temperature of the hot tumbling clothes disposed in wiping and heat exchange relation with the outer cone 75; and also, a second temperature sensing or thermal element T2 is arranged within the hollow body of the sheet 78 in good heat exchange relation with the hot air stream therethrough, whereby the temperature of the second thermal element T2 is directly controlled by the temperature of the hot air circulated through the drum 31 and into contact with the tumbling fabrics therein. Of course, it will be understood that the temperature of the hot air circulated through the drum 31 normally exceeds the temperature of the hot tumbling fabrics therein, whereby the second thermal element T2 is arranged to sense a temperature somewhat higher than that sensed by the first thermal element T1. Preferably, the thermal elements T1 and T2 are of the thermistor type and are respectively connected into a bridge circuit, described more fully hereinafter, via the two branches 81a and 81b of an armored cable 81 arranged between the outer and inner sheets 69 and 70 of the front door 24. More particularly, one end of the cable 81 extends through a hole 82 formed in the inner wall 70, adjacent to the first structure 73, as shown in Figs. 2 and 3, and the other end of the cable 81 extends through another hole 83 formed in the inner wall 70 adjacent to the upper hinge 71, as shown in Fig. 3. By this arrangement of the cable 81, the thermal elements T1 and T2 are included in the bridge circuit previously mentioned and described more fully hereinafter.

Referring now to Fig. 13, the machine 20 comprises a control circuit 100 that includes a program controller 101, a cycle controller 102, a heat controller 103, a pilot lamp 104, a signal lamp 105 and an audible signal 106. The program controller 101 comprises a rotatably mounted operating shaft 107 carrying a manually operable dial 108 on the outer end thereof that cooperates with an index marker 109; the cycle controller 102 comprises a rotatably mounted operating shaft 110 carrying a manually operable dial 111 on the outer end thereof that cooperates with an index marker 112; and the heat controller 103 comprises a rotatably mounted operating shaft, not shown, carrying a manually operable dial 113 on the outer end thereof that cooperates with an index marker 114. As indicated in Fig. 1, the program controller 101 is mounted below the left-hand portion of the backsplash 26; and the associated control dial 108 is arranged on top of the backsplash 26 adjacent to the left-hand side thereof, the cooperating index marker 109 being carried by the adjacent portion of the backsplash 26. Similarly, the heat controller 103 is mounted below the right-hand portion of the backsplash 26; and the associated control dial 113 is arranged on top of the backsplash 26 adjacent to the right-hand side thereof, the cooperating index marker 114 being carried by the adjacent portion of the backsplash 26. The central portion of the backsplash 26 carries an upstanding hollow hood-like structure 115, within which the cycle controller 102 is mounted, the control dial 111 of the cycle control 102 being arranged adjacent to the top of the structure 115 and cooperating with the associated index marker 114 carried by the top of the structure 115. The pilot lamp 104 is also mounted within the structure 115 and is visible, when illuminated, through a cooperating window 116 provided in the base of the structure 115; and likewise, the signal lamp 105 is mounted within the structure 115 and is visible, when illuminated, through an associated window 117 provided in the structure 115 just above the window 116. Furthermore, the audible signal 106 is also suitably mounted within the structure 115.

Figure 9:
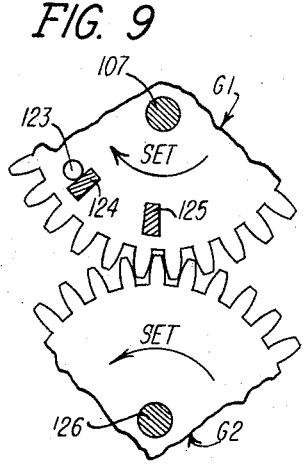
Fig. 9 is a greatly enlarged fragmentary sectional view of the program controller, taken in the direction of the arrows along the line 9—9 in Fig. 8, and illustrating a detail of construction thereof.

The construction and arrangement of the program controller 101 is illustrated in Figs. 6, 8, 9, 10, 11, and 13; and in Fig. 6, it will be observed that the control dial 108 comprises a centrally disposed knob or handle portion 118 and a surrounding skirt portion 119, the skirt 119 carrying calibrating indicia. Specifically, 60° of the skirt 119 comprises an off position, and 300° of the skirt 119 comprises a variable on position corresponding to a settable total time interval of 120 minutes, the control dial 108 being set from its off position in the clockwise direction into its variable on position, as indicated by the cooperation between the indicia carried by the skirt 119 and the coopertaing index marker 109. Referring now to Fig. 8, the operating shaft 107 of the program controller 101 is rotatably mounted in a pair of longitudinally spaced-apart bearings 120, and the portion thereof disposed intermediate the bearings 120 carries three insulating control cams C1, C2 and C3 that respectively cooperate with three sets of switch springs S1, S2 and S3. Also, the program controller 101 comprises a timer motor TM of the synchronous type, preferably a "Telechron" motor provided with an associated gear box 121 having an operating shaft 122 that is driven in the counterclockwise direction. The shafts 107 and 122 are arranged in longitudinal alignment, and the adjacent ends thereof respectively terminate the two cooperating elements of an intervening slip clutch SC1 that accommodates rotation of the shaft 107 with respect to the shaft 122 under the control of the manual dial 108 and that effects driving of the shaft 107 by the shaft 122. A gear G1 is also rigidly secured to the shaft 107 adjacent to the right-hand bearing 120 and carries a longitudinally projecting pin 123 that cooperates with two angularly spaced-apart stops 124 and 125, as best shown in Fig. 9. More particularly, when the shaft 107 is rotated in the counterclockwise direction into its off position, the pin 123 engages the stop 124; and when the shaft 107 is rotated in the clockwise direction into the full extremity of its variable on position, the pin 123 engages the stop 125. Accordingly, the cooperation between the pin 123 and the two angularly spaced-apart stops 124 and 125 defines the angle of 300° through which the control dial 108 is manually settable.

Figure 10:
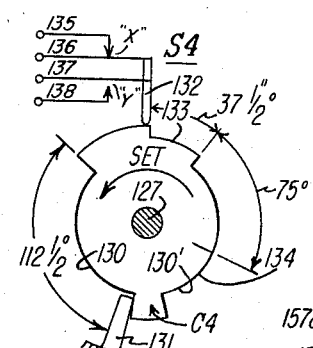
Fig. 10 is another greatly enlarged sectional view of the program controller, taken in the direction of the arrows along the line 10—10 in Fig. 8, and illustrating another detail of construction thereof.

Also, the program controller 101 comprises two other operating shafts 126 and 127 arranged in longitudinal alignment with each other and disposed below the longitudinally aligned operating shafts 107 and 122. The shaft 126 is rotatably mounted in a pair of longitudinally spaced-apart bearings 128; and the shaft 127 is rotatably mounted in a pair of longitudinally spaced-apart bearings 129. The adjacent ends of the operating shafts 126 and 127 respectively terminate the two cooperating elements of a slip clutch SC2 that accommodates rotation of the shaft 126 with respect to the shaft 127 and also driving of the shaft 127 by the shaft 126. Also, a gear G2 is rigidly secured to the operating shaft 126 and arranged in meshing relation with the gear G1; whereby the rotation of the shaft 107 is imparted to the shaft 126 by virtue of the interposed gear drive G1—G2. Further, an insulating control cam C4 is rigidly secured to the operating shaft 127 and cooperates with an associated set of switch springs S4, as best shown in Fig. 10. In the arrangement, an arcuate cutout 130 of 112½° is provided in the periphery of the control cam C4 that receives an associated stop 131; whereby the control cam C4 is rotatable only through a corresponding angle between its limit positions and from its normal position into its fully operated position. Also, the periphery of the control cam C4 is provided with another cutout 130' that cooperates with the insulating cam follower 132 of the set of switch springs S4; which cutout 130' comprises two levels 133 and 134, the level 133 subtending an arc of 37½°, and the level 134 subtending an arc of at least 75°. The arrangement will best be understood in conjunction with the construction of the set of switch springs S4 that includes four individual switch springs 135, 136, 137 and 138, the switch springs 135 and 136 providing a pair of "X" contacts therebetween, and the switch springs 137 and 138 providing a pair of "Y" contacts therebetween. Specifically, when the control cam C4 occupies its normal position, the cam follower 132 engages the highest level of the periphery thereof closing the "X" contacts between the switch springs 135 and 136 and opening the "Y" contacts between the switch springs 137 and 138. When the control cam C4 occupies a set position in the counterclockwise direction out of its normal position and within the 37½° angle of its level 133, the cam follower 132 engaging the level 133 opens the "X" contacts, while retaining open the "Y" contacts; and when the control cam C4 occupies a set position in the counterclockwise direction beyond the angle of its level 133 and within the 75° angle of its level 134, the cam follower 132 engaging the level 134 closes the "Y" contacts while retaining open the "X" contacts.

Figure 11:
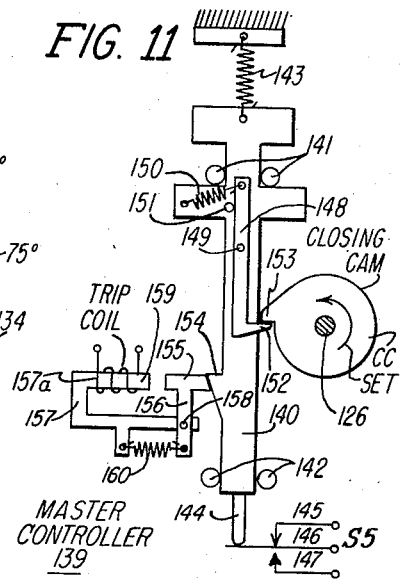
Fig. 11 is a further greatly enlarged sectional view of the program controller, taken in the direction of the arrows along the line 11—11 in Fig. 8, and illustrating a further detail of construction thereof.

Further, the program controller 101 comprises a master controller or circuit breaker 139, as best shown in Fig. 11, that includes a slide 140 mounted for limited guided movement between set and trip positions by upper and lower pairs of rollers 141 and 142, the slide 140 being biased into its upper or trip position by an associated spring 143, and being movable into its lower or set position by an associated closing cam CC rigidly secured to the operating shaft 126. The lower end of the slide 140 carries an insulating operator 144 that cooperates with a set of switch springs S5 including three individual switch springs 145, 146 and 147. In the arrangement, when the slide 140 occupies its trip position, the contacts between the switch springs 146 and 145 are closed, and the contacts between the switch springs 146 and 147 are open, whereas, when the slide 140 occupies its set position, the contacts between the switch springs 146 and 145 are open, and the contacts between the switch springs 146 and 147 are closed. More particularly, the slide 140 carries a setting dog 148 that is pivotally mounted thereon by a pin 149, the dog 148 being biased in the counterclockwise direction about the pin 149 by a spring 150 and against an associated stop 151. The lower end of the dog 148 includes an outwardly projecting lug 152 that cooperates with an outwardly projecting lug 153 carried by the closing cam CC. Also, the slide 140 carries an outwardly extending latch projection 154 that cooperates with an associated latch 155 carried by an armature 156 that is pivotally mounted upon a field element 157 by a pin 158, the field element 157 being provided with a pole piece 159 cooperating with the armature 156 and carrying a trip coil 157a, the armature 156 being biased away from the pole piece 159 about the pivot pin 158 by an associated spring 160; whereby the latch 157 is biased into cooperating relation with the latch projection 154. Of course, it will be understood that when the trip coil 157a is energized, the armature 156 is attracted by the pole piece 159 against the bias of the spring 160 moving the latch 155 out of cooperating relation with the latch projection 154.

Considering now the general mode of operation of the circuit breaker 139, it will be understood that when the operating shaft 126 is rotated in the counterclockwise direction, as viewed in Fig. 11, the closing cam CC is rotated therewith so that the lug 153 urges the lug 152 downwardly causing the dog 148 to move the slide 140 from its trip position into its set position; whereby the latch 155 engages the latch projection 154 retaining the slide 140 in its set position. Upon continued counterclockwise rotation of the operating shaft 126, the lug 153 rides out of engagement with the lug 152, without effect, since the slide 140 is latched in its set position by the latch 155. Upon subsequent return of the operating shaft 126 in the clockwise direction, the lug 153 merely rides over the outer end of the lug 152, the dog 148 being mounted for pivotal movement about the pin 149 in the clockwise direction against the bias of the spring 150; whereby the closing cam CC is again conditioned to effect subsequent setting of the slide 140. When the slide 140 occupies its set position, energization of the trip coil 157a effects the release thereof and the consequent return of the slide 140 back into its trip position. Specifically, the armature 156 is attracted by the pole piece 159 rotating the armature 156 in the counterclockwise direction against the bias of the spring 160; whereby the latch 155 disengages the latch projection 154 so that the spring 143 may return the slide 140 upwardly back into its trip position.

Considering now the overall operation of the program controller 101 in conjunction with Figs. 6, 8, 9, 10 and 11, it is first noted that the manual dial 108 is set in the clockwise direction out of its off position into its variable on position, the slip clutch SC1 accommodating rotation of the operation shaft 107 with respect to the operating shaft 122; whereby the operating shaft 107 drives the operating shaft 126 through the gears G1—G2, so that the operating shaft 126 is set in the counterclockwise direction effecting setting of the operating shaft 127 in the counterclockwise direction through the slip clutch SC2. The setting of the operating shaft 107 causes the control cam C1, C2 and C3 respectively to govern the sets of switch springs S1, S2 and S3; whereby the circuits are controlled, as explained more fully hereinafter, to effect operation of the timer motor TM so that the operating shaft 122 is rotated in the counterclockwise direction on a timed basis so as to drive the operating shaft 107 in the counterclockwise direction in order to restore the manual dial 108 back into its off position upon a timed basis. More particularly, the operating shaft 122 extending from the gear box 121 is rotated through an angle of 2½° per minute; whereby the time interval required to restore the manual dial 108 back into its off position is dependent upon the angle of the initial setting thereof into its variable on position.

In the operation of the machine 20, it is assumed that the minimum setting of the manual dial 108 is 112½° corresponding to a minimum time interval of 45 minutes; whereby the setting of the manual dial 108 in the clockwise direction out of its off position into its variable on position effects setting of the operating shaft 107, at least 112½° in the clockwise direction and setting of the operating shafts 126 and 127 at least 112½° in the counterclockwise direction from their normal positions. This setting of the operating shaft 127 causes the control cam C4 to govern the set of switch springs S4 so that the cam follower 132 engages the lowest level 134 on the periphery thereof effecting opening of the "X" contacts and closing of the "Y" contacts, as shown in Fig. 10. As the timer motor TM returns the operating shaft 107 in the counterclockwise direction, the operating shafts 126 and 127 are returned in the clockwise direction. At the expiration of an initial time interval of 30 minutes, the intermediate level 133 on the periphery of the control cam C4 rides under the cam follower 132 effecting operation of the set of switch springs S4, opening the "Y" contacts thereof while retaining open the "X" contacts thereof. At the expiration of an additional time interval of 15 minutes, the operating shaft 107 rotates the manual dial 108 in the counterclockwise direction back into its off position; whereby the operating shaft 127 is rotated in the clockwise direction back into its normal position so that the highest level on the periphery of the control cam C4 rides under the cam follower 132 in order to close the "X" contacts thereof.

Also, in the operation of the program controller 101, the setting of the manual dial 108 in the clockwise direction effects setting of the operating shaft 126 in the counterclockwise direction, as previously explained; whereby the closing cam CC effects operation of the circuit breaker 139 into its set position correspondingly to govern the set of switch springs S5, as will be understood from Fig. 11. Subsequently, when the timer motor TM returns the manual dial 108 in the counterclockwise direction back into its off position, the operating shaft 126 is returned in the clockwise direction back into its normal position so that the closing cam CC re-engages the dog 148 preparing the circuit breaker 139 to be operated back into its set poistion, in the event it has, in the interim, been operated into its trip position. At this point, it is noted that it is not necessary that the circuit breaker 139 be operated from its set position into its trip position between the setting of the manual dial 108 out of its off position and the return thereof back into its off position, since the operation of the circuit breaker 139 from its set position into its trip position is governed entirely by the release of the latch 155 that, in turn, is governed entirely by the energization of the trip coil 157a; which trip coil 157a is energized only under certain operating conditions in the normal operation of the machine 20, as explained more fully hereinafter.

The construction and arrangement of the cycle controller 102 is illustrated in Figs. 7 and 13; and in Fig. 7 it will be observed that the control dial 111 comprises a centrally disposed knob or handle portion 161 and a surrounding skirt portion 162, the skirt 162 carrying calibrating indicia. Specifically, the skirt 162 comprises three legends corresponding to the three control positions of the cycle controller 102 and respectively marked: "damp-dry automatic," "bone-dry reduced-heat" and "bone-dry full-heat." As a matter of convenience, the corresponding segments of the skirt 162 are identified by the reference characters 162A, 162B and 162C respectively. As shown in Fig. 13, the other end of the operating shaft 110 of the cycle controller 102 carries a rotary switch 163 including a wiper 164 rigidly secured to the end of the operating shaft 110 and two cooperating commutator rings provided with three individual conducting segments 165A, 165B and 165C respectively corresponding to the segments 162A, 162B and 162C of the manual dial 111.

The heat controller 103 is of conventional construction and of a well-known thermal-control type, as indicated in Fig. 13. Specifically, the control dial 113 is provided with three segments respectively carrying the indicia "H," "M" and "L" respectively corresponding to high, medium and low temperature settings. Further, the heat controller 103 comprises operative mechanism, not shown, and including a thermal control element that is connected via a capillary tube 166 to a thermal bulb 167, as well as an insulating actuator 168 carrying two contact bridging members 169 and 170. In the arrangement, the thermal bulb 167 is disposed within the machine 20, as illustrated in Fig. 4; and specifically, the thermal bulb 167 is arranged within the casing 27 adjacent to the left-hand side of the tubular side wall 28 thereof and exteriorly of the adjacent cylindrical side wall 32 of the drum 31 and within the upper portion of the passage 55, so that it is in heat exchange relation with the hot air passing through the drum 31 and via the passage 55 into the condensing chamber 48, when the machine 20 is operated. The mechanism incorporated in the heat controller 103 is governed jointly by the rotary position of the manual dial 113 and the temperature sensed by the thermal bulb 167; whereby the actuator 168 is selectively operated to govern the contact bridging members 169 and 170. Specifically, the contact bridging members 169 and 170 normally occupy their closed positions and are operated into their open positions in response to the sensing by the thermal bulb 167 of a temperature exceeding that set by the manual dial 113. Upon cooling of the thermal bulb 167, the contact bridging members 169 and 170 are returned back into their normal closed positions.

Also, the control circuit 100 of the machine 20 comprises, as illustrated in Fig. 13, certain auxiliary facilities including a main terminal block 171, a fuse link 172, a high temperature thermal cutout 173, a hydrostatic switch 174, and a thermal interrupter switch 175. The terminal block 171 is supported at the rear of the machine 20 and terminates a power supply system of the three-wire Edison type of 236-volts single-phase A.C. and including two outside lines 181 and 182 and a grounded neutral line 183; the fuse link 172 is arranged adjacent to the lower front of the machine 20, as shown in Fig. 2, and is of the replaceable type. The thermal cutout 173 is in the form of a thermostatic switch and is arranged in the upper left-hand portion of the tubular side wall 28 of the casing 27, as shown in Fig. 4, the thermal cutout 173 being operated only in the event of an abnormally high temperature within the casing 27 and entirely upon a basis of a safety device. The hydrostatic switch 174 is arranged in the lowermost portion of the bottom wall 47 of the casing 27, as shown in Figs. 4 and 5, and comprises, as shown in Fig. 13, a contact bridging member 176 controlling an associated pair of contacts, a connecting insulating actuator 177 and an expansible bellows 178. The hydrostatic switch 174 is also in the nature of a safety device and is operated from its normally closed position into its open position only in the event of the unusual and abnormal circumstance that an undesirable head of water is accumulated in the sump 48, as a consequence of failure of the drain pump 50. The interrupter switch 175 is of a conventional thermostatic control type and serves the function of effecting flashing of the signal lamp 105 in a well-known manner.

As illustrated in Fig. 13, the set of switch springs S1 comprises two individual switch springs 191 and 192; the set of switch springs S2 comprises two individual switch springs 193 and 194; and the set of switch springs S3 comprises four individual switch springs 195, 196, 197 and 198. The sets of switch springs S1, S2 and S3 are respectively controlled by the associated cams C1, C2 and C3 and occupy open positions when the program controller 101 occupies its off position. As indicated in Fig. 13, the control cam C1 may govern the set of switch springs S1 to operate the same into its open position 7 minutes before the control cam C3 is returned back into its off position after setting thereof; and similarly, the control cam C2 may govern the set of switch springs S2 to operate the same into its open position 1½ minutes before the control cam C3 is returned back into its off position after setting thereof. These items with regard to the configurations of the control cams C1 and C2 are not especially important and the control cams C1 and C2 may be arranged to operate the respective sets of switch springs S1 and S2 back into their open positions simultaneously with the operation of the set of switch springs S3 into its open position by the cam C3.

Turning now to the construction and arrangement of the drive motor 38, it is noted that this electric motor is of the split-phase type including a start winding 201 and a run winding 202 carried by a stator, not shown, and an inductively coupled rotor winding 203 carried by a rotor 204 that, in turn, carries the operating shaft 39. The operating shaft 39 is connected to a start and run control switch 205 that includes a contact bridging member 206 operatively associated with front and back pairs of contact sets, the bridging member 206 being carried by an insulating pull rod 207, the insulating pull rod 207 being connected to the operating shaft 39 by a speed responsive device 208. More particularly, the bridging member 206 is biased by an associated spring 209 into its closed position with respect to its back contacts and into its open position with respect to its front contacts, the contact bridging member 206 being operated by the speed responsive device 208, against the bias of the spring 209, into its open position with respect to its back contacts and into its closed position with respect to its front contacts, at a speed somewhat in excess of 50% of the normal running speed of the rotor 204.

Further, the control circuit 100 comprises a bridge circuit WB of the Wheatstone type, as previously noted, and including the two thermal elements T1 and T2, as well as two adjustable resistors R1 and R2, together with a rectifier unit RU and a potentiometer defined by a fixed resistor R3 and an adjustable resistor R4. As previously noted, the thermal elements T1 and T2 are preferably of the thermistor type characterized by having an exceedingly high negative temperature coefficient of resistance; and specifically, the temperature coefficient of resistance of each of these thermistors may be: —0.044 ohm/ohm/°C.; whereby the characteristic of the thermistor may be as follows:

| Temperature (°C.): | Total resistance (ohms) |
|---|---|
| 25 | 100,000 |
| 50 | 34,000 |
| 100 | 6,000 |
| 150 | 1,700 |
| 200 | 580 |

Considering now the connection and arrangement of the control circuit 100, the switch spring 191 is connected to the outside line 181; the switch spring 192 is connected by a conductor 210 to the switch spring 195; the switch springs 193 and 194 are respectively connected to a conductor 211 and to a feed conductor 212; the switch springs 196 and 198 are respectively connected to two conductors 213 and 214; and the switch spring 197 is connected to the outside line 182. The pilot lamp 104 is bridged across the neutral line 183 and the conductor 214; the timer motor TM is bridged across the neutral line 183 and the feed conductor 212. The signal lamp 105 is bridged in series relation with the termal flashing switch 175 across the neutral line 183 and a signal conductor 215; and likewise, the audible signal 106 is bridged across the neutral line 183 and the signal conductor 215. The switch spring 145 terminates the signal conductor 215; the switch spring 146 terminates the conductor 214; and the switch spring 147 terminates a conductor 216. The fuse link 172 is bridged across the conductor 216 and the feed conductor 212. The switch spring 135 terminates a conductor 217; the switch spring 136 terminates the feed conductor 212; the switch spring 137 terminates a conductor 218; and the switch spring 138 terminates a conductor 219. The composite heating unit comprises the two sections H1 and H2 each having a wattage rating of approximately 2250 watts; the heating unit section H1 is bridged between the conductor 219 and a conductor 220; and the heating unit section H2 is bridged between the conductors 218 and 220. The outer and inner conducting rings of the segment 165A of the selector switch 163 respectively terminate the neutral line 183 and a conductor 221; and the outer and inner conducting rings of the segment 165C of the selector switch 163 respectively terminate the conductors 218 and 219. The contacts of the pair associated with the upper bridging member 169 respectively terminate the conductor 213 and a conductor 222; and the lower contacts of the pair associated with the lower bridging member 170 respectively terminate the conductor 214 and a conductor 223. The thermal cutout 173 is bridged between the conductors 220 and 222. The solenoid 65a of the control valve 65 is bridged across the conductor 211 and a conductor 224. The contacts associated with the bridging member 176 respectively terminate the neutral line 183 and the conductor 224. The back contacts associated with the bridging member 206 respectively terminate the neutral line 183 and a conductor 225; and the front contacts associated with the bridging member 206 respectively terminate the conductors 223 and 219. The run winding 202 of the motor 38 is bridged between the neutral line 183 and the feed conductor 212; while the start winding 201 of the motor 38 is bridged between the feed conductor 212 and the conductor 225.

The input terminals of the rectifier unit RU are bridged across the conductors 217 and 221; while the output terminals of the rectifier unit RU are bridged across two conductors 226 and 227. The resistors R3 and R4 are bridged in series relation by a conductor 228 across the conductors 226 and 227 so as to define the potentiometer previously mentioned. The resistor R4 is of the adjustable type, as previously noted, and includes an adjustable wiper 229 terminating a conductor 230. The input terminals of the Wheatstone bridge WB are connected across the conductors 227 and 230; and the output terminals of the Wheatstone bridge WB are connected across a pair of conductors 231 and 232; across which the trip coil 157A is bridged.

The connection and arrangement of the control circuit 100 will best be understood in conjunction with the description of the mode of operation of the machine 20 under several different operating conditions, as explained more fully hereinafter; and, at this point, it is noted that the machine 20 may be operated to carry out three fundamentally different types of drying operations corresponding to the three settable positions of the cycle controller 102 and as indicated by the indicia carried by the manual dial 111 thereof.

Specifically, when the manual dial 111 of the cycle controller 102 occupies its damp-dry automatic position, the machine 20 may be governed under the joint control of the program controller 101 and the master controller or circuit breaker 139 to carry out a drying operation on an automatic basis and dependent fundamentally upon a damp-dry condition of the fabrics contained in the drum 31 as sensed by the thermal elements T1 and T2 included in the Wheatstone bridge circuit WB operatively connected to the trip coil 157a of the master controller 139.

Specifically, when the manual dial 111 of the cycle controller 102 occupies its bone-dry reduced-heat position, the machine 20 may be governed entirely under a control of the program controller 101 to carry out a drying operation on a timed basis and involving a relatively low final heating rate in the drying operation.

Specifically, when the manual dial 111 of the cycle controller 102 occupies its bone-dry full-heat position, the machine 20 may be governed entirely under the control of the program controller 101 to carry out a drying operation on a timed basis and involving only the relatively high heating rate in the drying operation.

Also, it is pointed out that in the operation of the machine 20 to carry out any one of the three different types of drying operations noted above, the heat controller 103 is selectively operative to maintain within the casing 27 the desired temperature preset by the manual dial 113, the manual dial 113 being settable into respective high, medium and low temperature positions, and the contact bridging members 169 and 170 being governed by the thermal bulb 167 in accordance with the temperature sensed thereby in a conventional manner. Specifically, the heat controller 103 alternately opens and closes the circuit for energizing the heating unit H1—H2 in response to the sensing thereby of respective high and low temperatures related to the setting of the manual dial 113.

Figure 12:
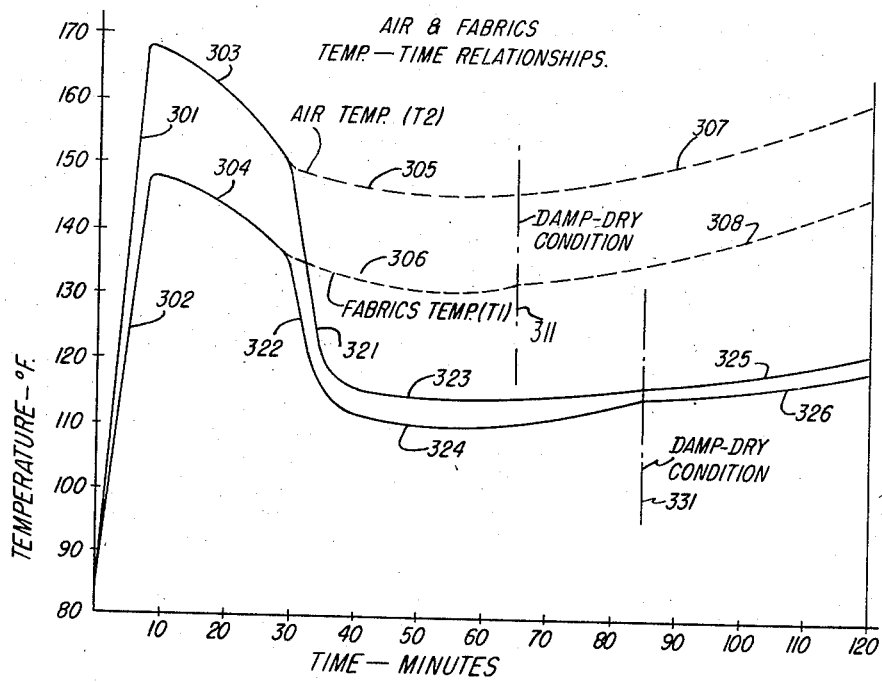
Fig. 12 is a graphical representation of the relationships between time and air temperature and between time and fabrics temperature in the operation of the machine.

Before proceeding with a detailed description of the operation of the control circuit 100, the following general explanation of the temperature-time relationships involved in the operation of the machine 20 are offered in conjunction with the curves of Fig. 12. Specifically assume that all of the elements of the machine 20 are at an ambient temperature of about 84° F., that the manual dial 113 of the heat controller 103 is set in its high temperature position, that the manual dial 113 of the cycle controller 102 occupies its bone-dry full-heat position, and that the program controller 101 is operated out of its off position into the extremity of its variable on position establishing a time interval of operation of 2 hours. At this time, operation of the machine 20 is initiated effecting operation of the drive motor 38, energization of the heating unit H1—H2, closure of the master controller 139, operation of the timer motor TM, and opening of the control valve 65; whereby the fabrics contained in the drum 31 are tumbled and heated in the manner previously explained.

In a first test productive of a portion of the data from which the curves of Fig. 12 were plotted, there was employed a standard load of 8# of turkish towels and the thermal devices T1 and T2 were used entirely for the purpose of measuring respectively the temperature of the fabrics tumbling in the drum 31 and the temperature of the hot air circulated through the rotating drum 31. In this first test, as shown in Fig. 12, the temperature of the air rose to about 168° F. in about 7 minutes, as indicated by the steep portion 301 of the upper curve, and the temperature of the fabrics rose to about 148° F., in about 8 minutes, as indicated by the steep portion 302 of the lower curve. At about 168° F., the heat controller 103 with the manual dial 113 in its high position effected opening of the circuit for energizing the heating unit H1—H2; whereby the temperature of the air was reduced, as indicated by the knee portion 303 of the upper curve, so that the temperature of the fabrics was correspondingly reduced, as indicated by the knee portion 304 of the lower curve. At least by the expiration of 10 minutes, the rotating fabrics were evolving a considerable amount of water vapor, so that notwithstanding the subsequent reclosure of the heat controller 103, the temperature of the air and the temperature of the fabrics continued to fall through the remainder of a total time interval extending to about 30 minutes. At this point, the upper and lower curves flattened-out, as illustrated by the respective broken line through portions 305 and 306 thereof until the tumbling fabrics reached a damp-dry condition, indicated by the intersecting vertical broken line 311 occurring after the expiration of a total time interval of about 65 minutes. At this point, the evolution of water vapor from the tumbling fabrics subsided substantially so that the air temperature and the fabrics temperature began to rise, as indicated by the respective broken line upsloping portions 307 and 308 of the upper and lower curves. This first test continued until the expiration of the 120 minutes set upon the program controller 101; whereby the fabrics reached a bone-dry condition shortly following 65 minutes of operation, and well before the expiration of the set 120 minutes, as clearly demonstrated by the broken line upwardly sloping portions 307 and 308 of the respective upper and lower curves.

Upon comparison of the broken line upper and lower curves, it will be observed that after the expiration of a substantial time interval and after the machine 20 reaches a stable operating condition in the drying of the tumbling fabrics, for instance, a time interval of 45 minutes, a minimum temperature difference (about 12° F.) exists between the upper and lower broken line curves along the vertical broken line 311 after the expiration of a total time interval of about 65 minutes and at the point in the drying cycle at which the tumbling fabrics reach a damp-dry condition, that is ideal for ironing purposes; whereby it is apparent that by the utilization of this minimum temperature difference between the upper and lower broken line curves for control purposes, there may be achieved an automatic control of the drying cycle to obtain a damp-dry condition of the fabrics at the conclusion of the drying cycle.

Also, a second test was conducted in the machine 20, under conditions identical to those described above in the first test, except that at the expiration of a time interval of 30 minutes, the manual dial 113 of the heat controller 103 was operated from its high temperature position into its low temperature position; whereby the air temperature and the fabrics temperature were reduced sharply as indicated by the solid downwardly sloped portions 321 and 322 of the upper and lower curves, so that the heat controller 103 did not reclose the circuit for energizing the heating unit H1—H2 until the expiration of a total time interval of about 35 minutes, so that the air temperature and the fabrics temperature flattened-out as indicated by the respective solid line trough portions 323 and 324 of the upper end lower curves. This general relationship between the upper nad lower curves was maintained until the tumbling fabrics reached a damp-dry condition, as indicated by the intersecting vertical broken line 331 occurring after the expiration of a total time interval of about 85 minutes. At this point, the evolution of water vapor from the tumbling fabrics subsided substantially so that the air temperature and the fabrics temperature began to rise, as indicated by the respective solid line upsloping portions 325 and 326 of the upper and lower curves. This second test continued until the expiration of the 120 minutes set by the program controller 101; whereby the fabrics reached a bone-dry condition shortly following 85 minutes of operation, and well before the expiration of the set 120 minutes, as clearly demonstrated by the solid line upwardly sloping portions 325 and 326 of the respective upper and lower curves.

Upon comparison of the solid line upper and lower curves, it will be observed that with the reduction of the heat supplied by the heating unit H1—H2 at the expiration of a time interval of 30 minutes and after the machine 20 reaches a stable operating condition in the drying of the tumbling fabrics, for instance, a time interval of 45 minutes, a minimum temperature difference (about 1° F. to 2° F.) exists between the upper and lower solid line curves along the vertical broken line 331 after the expiration of a total time interval of about 85 minutes and at the point in the drying cycle at which the tumbling fabrics reach a damp-dry condition that is ideal for ironing purposes; whereby it is apparent that by the utilization of this minimum temperature difference between the upper and lower solid line curves for control purposes, there may be achieved an automatic control of the drying cycle to obtain a damp-dry condition of the fabrics at the conclusion of the drying cycle.

Moreover, from a comparison of the upper broken line curves and the lower solid line curves involved in the respective first and second tests, it will be appreciated that the time interval of operation of the machine 20 to reach the damp-dry condition of the tumbling fabrics is not greatly extended by the reduction of the heat produced by the heating unit H1—H2 following the initial time interval of high heat of 30 minutes. Specifically, it appears that in the full heating cycle of the first test, this damp-dry condition was reached at the expiration of 65 minutes; whereas in the reduced heating cycle of the second test, this damp-dry condition was reached at the expiration of 85 minutes. Furthermore, it will be appreciated that the change in the temperature difference between the upper and lower broken line curves as time proceeded in the first test was not as great as the change in the temperature difference between the upper and lower solid line curves as time proceeded in the second test. In other words: in the first test, the minimum temperature difference (about 12° F.) at the vertical broken line 311 comprises only a modest reduction with respect to the maximum temperature difference; whereas in the second test, the minimum temperature difference (about 1° F. to 2° F.) at the vertical broken line 331 comprises a very substantial reduction with respect to the maximum temperature difference. Accordingly, it will be understood that in the second test, the reduction of the heating rate of the heating unit H1—H2 after the expiration of the initial time interval of 30 minutes was effective to bring about an amplification or accentuation of the temperature difference between the solid line upper and lower curves; which minimum temperature difference may be utilized most advantageously for the control purpose of obtaining a damp-dry condition of the fabrics at the conclusion of the drying cycle of the machine 20.

Proceeding now with the detailed description of the control circuit 100, it is first assumed that the manual dial 111 of the cycle controller 102 is set into its damp-dry automatic position, that the manual dial 113 of the heat controller 103 is set into its high temperature position, and that the manual dial 108 of the program controller 101 is set out of its off position to the extremity of its variable on position corresponding to a time interval of 120 minutes; whereby operation of the machine 20 is initiated. More particularly, the control cams C1, C2 and C3 operate the respective sets of switch springs S1, S2 and S3 into their closed positions; the closing cam CC operates the slide 140 of the master controller 139 into its set position so that it is latched therein by the latch 155; and the control cam C4 operates the set of switch springs S4 so that the "X" contacts thereof are opened and the "Y" contacts thereof are closed. When the master controller 139 is operated into its set position, the contacts between the switch springs 145 and 146 are opened, and the contacts between the set of switch springs 146 and 147 are closed. Also in the setting of the manual dial 108, the shaft 107 is rotated through an angle of 300°; whereby the shaft 127 is rotated through an angle of 112½° by virtue of the cooperation between the cam C4 and the stop 131, as previously explained. Accordingly, the outside line 182 is connected via the switch springs 197 and 198 to the conductor 214 thereby to complete a circuit for illuminating the pilot lamp 104. The conductor 214 is further connected via the switch springs 146 and 147, the conductor 216 and the fuse link 172 to the feed conductor 212, thereby to complete a circuit for operating the timer motor TM. Also, at this time, the start winding 201 and the run winding 202 of the drive motor 38 are energized in parallel relation between the feed conductor 212 and the neutral line 183, whereby the rotor 204 starts and quickly reaches a speed somewhat in excess of 50% of its synchronous speed so that the speed responsive device 208 effects operation of the switch 205. More particularly, the contact bridging member 206 opens its back contacts to interrupt the circuit for energizing the start winding 201 of the drive motor 38 and closes its front contacts to bridge together the conductors 219 and 223, thereby to complete circuits for energizing in parallel relation the two sections H1 and H2 of the heating unit. More particularly, the conductors 219 and 218 are bridged together at the contacts "Y" of the set of switch springs S4, so that the heating sections H1 and H2 of the heating unit are bridged in parallel relation between the conductors 219 and 220, the conductor 220 being connected via the temperature cutout 173 to the conductor 222 and the conductors 222 and 223 being connected via the respective contact bridging members 169 and 170 to the conductors 213 and 214. As previously explained, the conductor 214 is connected via the switch springs 198 and 197 to the outside line 182; and the conductor 213 is connected via the switch springs 196 and 195, the conductor 210 and the switch springs 192 and 191 to the outside line 181. Accordingly, the two sections H1 and H2 of the heating unit are energized in parallel relation across the outside lines 181 and 182 so that full heat is developed thereby. Also, the feed conductor 212 is connected via the switch springs 194 and 193 to the conductor 211; and the neutral line 183 is connected via the bridging member 176 to the conductor 224; whereby the solenoid 65a is energized across the conductors 211 and 224 bringing about operation of the control valve 65 into its open position so that the cool water is supplied from the supply conduit 62 to the jet nozzle 67 and projected onto the pin 68 producing the spray of cool water in the condensing chamber 48, in the manner previously explained. Hence, at this time, operation of the machine 20 is underway, and at any time should the temperature within the casing 27, as sensed by the thermal bulb 167, exceed that set by the manual dial 113, the heat controller 103 will be governed to effect operation of the bridging members 169 and 170 into their open positions, with the result that the heating unit H1—H2 is deenergized. Thereafter, when the temperature within the casing 27 subsides, the thermal bulb 167 governs the heat controller 103 so that the bridging members 169 and 170 are returned into their closed positions, again energizing the heating unit H1—H2; whereby the temperature within the casing 27 is maintained by the heat controller 103 in order that the drying of the clothes tumbling in the drum 31 may proceed at the desired rate.

After the expiration of 30 minutes following initiation of operation of the machine 20, and regardless of the set position of the manual dial 108 of the program controller 101, the timer motor TM returns the operating shaft 107 back toward its off position through a corresponding angle of 75°, whereby the operating shaft 127 is correspondingly returned through an angle of 75°, so that the control cam C4 operates the set of switch springs S4 in order to open the contacts "Y" thereof without closing the contacts "X" thereof. Opening of the contacts "Y" interrupts a local point in the circuit for energizing the section H2 of the heating unit by disconnecting the conductors 218 and 219; whereby only the section H1 of the heating unit is energized hereinafter in the drying cycle, and as a consequence the heating rate thereof is substantially reduced, so that the temperature within the casing 27 is substantially reduced in an obvious manner.

After the expiration of an additional 15 minutes the timer motor TM brings about the return of the operating shaft 127 back into its normal position as estaablished by the cooperation between the control cam C4 and the stop 131; whereby the set of switch springs S4 is further operated by the control cam C4. More particularly, the contacts "X" thereof are closed, so that a circuit is completed for supplying power to the rectifier unit RU, the circuit extending from the feed conductor 212 via the switch springs 136 and 135 and the conductor 217 to one input terminal of the rectifier unit RU, and from the neutral line 183 via the wiper 164 and the arcuate ring segments 165A and the conductor 221 to the other input terminal of the rectifier unit RU. Accordingly, after the expiration of 45 minutes in the drying cycle, the rectifier unit RU is energized, and regardless of the setting of the manual dial 108 of the program controller 101, assuming a minimum setting of the manual dial 108 of 45 minutes. When the rectifier unit RU is thus energized, a suitable direct voltage is produced between the output terminals thereof and impressed via the conductors 226 and 227 across the resistors R3 and R4 connected together via the conductor 228 to produce the potentiometer; whereby a suitable and appropriate direct voltage is impressed between the input terminals of the Wheatstone bridge circuit WB, so that some output voltage appears between the output terminals of the Wheatstone bridge circuit WB, across which the trip coil 157a is connected, and depending upon the condition of balance of the Wheatstone bridge circuit WB, as explained below.

More particularly, the resistors R1 and R2 are adjusted so that the Wheatstone bridge WB is balanced, when the difference between the resistances of the thermistors T1 and T2 is a maximum, corresponding to a maximum temperature difference therebetween; whereby the Wheatstone bridge WB is unbalanced when the temperature of the fabrics rises toward the temperature of the air, as respectively sensed by the thermal devices T1 and T2, thereby to bring about energization of the trip coil 157a sufficiently to release the latch 155, so that the slide 140 is released with the consequent operation of the master controller 139 into its trip position. Recapitulating, when the temperature sensed by the thermistor T1 rises toward the temperature sensed by the thermistor T2 and into a predetermined temperature difference representing substantially a minimum temperature difference therebetween, the voltage appearing at the output terminals of the Wheatstone bridge WB is adequate to bring about the operation of the master controller 139 into its trip position, as explained above; whereby the master controller 139 is tripped at the time that the tumbling fabrics reach substantially a damp-dry condition, which condition being evidenced by the substantially minimum temperature difference between the temperatures sensed by the thermistors T1 and T2 is in fact independent of the great variety of variable conditions that actually determine this particular time, and including such variable conditions as the weight of the load of clothes undergoing the drying operation and the character thereof, the initial weight of moisture carried thereby, etc. In other words, while these variable factors determine the time interval required in the operation of the program controller 101 within the 120 minutes preset that the tumbling fabrics are in a damp-dry condition, the condition manifests itself by the control described above with the consequent operation of the master controller 139 into its trip position; which manifestation requires no estimates, measurements or experimentations on the part of the operator of the machine 20.

When the master controller 139 is operated into its trip position, the set of switch springs S5 is operated to open the contacts between the switch springs 146 and 147 so as to bring about the removal of potential from the feed conductor 212, thereby arresting operation of the timer motor TM, deenergizing the rectifier unit RU, deenergizing the solenoid 65a and deenergizing the run winding 202 of the drive motor 38. Accordingly, operation of the program controller 101 is arrested before it is returned back into its off position, since operation of the timer motor TM is arrested. Also, the deenergization of the rectifier unit RU brings about the deenergization of the trip coil 157a, so that the latch 155 is released and returned back into its restored position. Furthermore, the deenergization of the solenoid 65a brings about the return of the control valve 65 into its closed position, so as to arrest the supply of cool water into the condensing chamber 48. Furthermore, operation of the drive motor 38 is arrested so that the speed responsive device 208 governs the switch 205, with the result that the bridging member 206 opens its front contacts and closes its back contacts. Opening of the front contacts associated with the bridging member 206 effects deenergization of the section H1 of the heating unit; while closing of the back contacts associated with the bridging member 206 reconnects the start winding 201 across the feed conductor 212 and the neutral line 183, so as to prepare the drive motor 38 for restarting in the next cycle of operation of the machine 20.

Moreover, the set of switch springs S5 is operated when the master controller 139 is operated into its trip position to close the contacts between the switch springs 146 and 145 so that the conductor 214 is connected to the signal conductor 215 bringing about the operation of the audible signal 106 and the illumination of the signal lamp 105 via the thermal interrupter 175. Moreover, at this time the pilot lamp 104 remains illuminated indicating that the operation of the program controller 101 has been arrested before return thereof back into its off position. The operation of the audible signal 106 in conjunction with the flashing of the signal lamp 105 produced by the thermal interrupter 175 indicates to the operator that the operation of the machine 20 has been automatically arrested and at this time the load of clothes is in the damp-dry condition desired.

The operator then returns the manual dial 108 of the program controller 101 back into its off position so that the control cams C1, C2 and C3 return the sets of switch springs S1, S2 and S3 back into their normal open positions. Specifically, in the set of switch springs S3 the contacts between the switch springs 197 and 198 are open so as to interrupt the circuit for illuminating the pilot lamp 104, as well as the parallel circuits for operating the audible signal 106 and for illuminating the signal lamp 105. Accordingly, at this time the elements of the control circuits 100 occupy their normal positions.

Now assume that the manual dial 111 of the cycle controller 102 is set into its bone-dry reduced-heat position, that the manual dial 113 of the heat controller 103 is set into its high temperature position, and that the manual dial 108 of the program controller 101 is set out of its off position into its variable on position in the range between 45 minutes and 120 minutes, operation of the machine 20 is initiated and proceeds initially in the manner described above. Specifically, the sections H1 and H2 of the heating unit are energized in parallel relation for the first 30 minutes of the cycle under the control of the cam C4 and the associated set of switch springs S4. At the conclusion of the time interval of 30-minutes mentioned, the cam C4 operates the set of switch springs S4 so as to open the "Y" contacts between the switch springs 137 and 138 in order to bring about the deenergization of the section H2 of the heating unit throughout the remainder of the cycle. At the expiration of an additional time interval of 15 minutes, the cam C4 again operates the set of switch springs S4 to close the "X" contacts between the switch springs 135 and 136 so as to prepare the circuit for operating the rectifier unit RU, in the manner previously explained. However, in the present example, the rectifier unit RU is not operated, since the wiper 164 of the rotary switch 163 engages the conducting segments 165B of the outer and inner rings, instead of the conducting segments 165A of the outer and inner rings. Since the rectifier unit RU is not operated in the present example, the actions of the thermal units T1 and T2 are without effect, since the Wheatstone bridge circuit WB is not energized; whereby there is no possibility of the energization of the trip coil 157a of the master controller 139. Accordingly, in the present example, operation of the machine 20 continues entirely under the control of the program controller 101 upon a timed basis and until the timer motor TM returns the manual dial 108 and the operating shaft 107 back into their off positions; whereupon the control cams C1, C2 and C3 operate the respective sets of switch springs S1, S2 and S3 back into their normal open positions arresting operation of the machine 20 in a manner substantially identical to that previously described.

More particularly, as illustrated, 7 minutes before the manual dial 108 is returned back into its off position, the control cam C1 operates the set of switch springs S1 into its open position, thereby to interrupt the circuit for energizing the section H1 of the heating unit; and 1½ minutes before the manual dial 108 is returned back into its off position, the control cam C2 operates the set of switch springs S2 into its open position, thereby to interrupt the circuit for energizing the solenoid 65a in order to effect the return of the control valve 65 back into its closed position so as to arrest the supply of cool water into the condensing chamber 48. Finally, when the manual dial 108 is returned into its off position the control cam C3 operates the set of switch springs S3 into its open position thereby to arrest operation of the drive motor 38 and the timer motor TM and to extinguish the pilot lamp 104. At this time all of the circuits in the control circuits 100 occupy their normal open positions.

In view of the foregoing, it will be understood that when the manual dial 111 of the cycle controller 102 occupies its bone-dry reduced-heat position, the operation of the machine 20 is governed entirely upon a timed basis by the program controller 101; however, the sections H1 and H2 of the heating unit are energized in parallel relation to produce heat at the high heating rate only during the initial time interval of 30 minutes. In the cycle, and thereafter, only the section H1 of the heating unit is energized to produce heat at the low heating rate.

Now assume that the manual dial 111 of the cycle controller 102 is set into its bone-dry full-heat position, that the manual dial 113 of the heat controller 103 is set into its high temperature position, and that the manual dial 108 of the program controller 101 is set out of its off position into its variable on position in the range between 45 minutes and 120 minutes, operation of the machine 20 is initiated and proceeds initially in the manner described above. Specifically, the sections H1 and H2 of the heating unit are energized in parallel relation throughout the cycle and independently of the control cam C4 and the associated set of switch springs S4 by virtue of the fact that the wiper 164 of the rotary switch 163 bridges together the conducting segments 165C of the outer and inner ring, thereby completing a local bridge connection between the conductors 218 and 219 so as to render the energization of the sections H2 of the heating unit independent of the operated position of the set of switch springs S4 governed by the cam C4. Accordingly, in the present example, the cycle proceeds entirely under the control of the program controller 101 upon a timed basis and until the timer motor TM returns the manual dial 108 and the operating shaft 107 back into their off positions effecting opening of the sets of switch springs S1, S2 and S3, in the manner previously described.

In view of the foregoing, it will be understood that when the manual dial 111 of the cycle controller 102 occupies its bone-dry full-heat position the operation of the machine 20 is governed entirely upon a timed basis by the program controller 101; and moreover, the sections H1 and H2 of the heating unit are energized in parallel relation throughout the cycle to produce heat at the high heating rate.

In each of the three fundamental cycles of the machine 20, the operation of the control circuit 100 has been described when the manual dial 113 of the heat controller 103 occupies its high temperature position; which control is in no way essential to these fundamental modes of operation; and in each instance, the manual dial 113 of the heat controller 103 might have occupied its medium temperature position or its low temperature position. This will be apparent when it is appreciated that the setting of the manual dial 113 merely governs the sensing temperature of the thermal bulb 167 that is effective to bring about operation of the bridging members 169 and 170 into their open positions with the consequent local deenergization of one or both sections of the heating unit H1—H2, in the manner previously explained. Specifically, the setting of the manual dial 113 of the heat controller 103 is ordinarily made dependent upon the character of the fabrics that are being dried, heavy cotton fabrics being normally dried at a high temperature, light cotton fabrics being normally dried at a medium temperature, and synthetic fabrics being normally dried at a low temperature. As previously explained in conjunction with Fig. 12: the maximum temperature of the air circulated through the drum 31 is about 168° F., when the manual dial 113 of the heat controller 103 occupies its high temperature position; the maximum temperature of the air circulated through the drum 31 is about 115° F., when the manual dial 113 occupies its low temperature position; and the maximum temperature of the air circulated through the drum 31 is about 145° F., when the manual dial 113 occupies its medium temperature position.

Furthermore, it is reiterated that when the manual dial 111 of the cycle controller 102 occupies either one of its bone-dry positions, the operating cycle of the control circuit 100 is governed on a timed basis by the program controller 101; whereas, when the manual dial 111 of the cycle controller 102 occupies its damp-dry position, the operating cycle of the control circuit 100 is governed jointly by the program controller 101 and by the thermal devices T1 and T2 and on an automatic basis governed in response to the temperatures as sensed by the thermal devices T1 and T2 and dependent upon the damp-dry condition of the fabrics, as previously explained. Accordingly, in the last-mentioned case, it is recommended that the manual dial 108 of the program controller 101 be set out of its off position to the extremity of its variable on position corresponding to a time interval of 120 minutes, since the cycle is governed automatically by the thermal devices T1 and T2 as explained, and so as positively to prevent interference with the automatic control by a timed operation of the program controller 101.

In view of the foregoing, it is apparent that there has been provided improved apparatus for drying fabrics, or the like, and particularly such apparatus as employed in a clothes drying machine of the home-laundry type, as well as an improved electric control circuit for a machine of the character mentioned permitting of complete flexibility in establishing the desired cycle of operation thereof; and while the control arrangement has been disclosed in conjunction with a clothes drying machine of the enclosed spray-condenser type, it is not peculiar thereto and may be applied in a substantially identical manner to a conventional clothes drying machine of the type that is continuously ventilated to the exterior thereof.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a clothes drying machine that is operative to tumble wet clothes received thereby and to circulate hot air into contact with the wet tumbling clothes so as to effect heating and drying thereof; the combination comprising manually operable means for initiating operation of said machine, a first thermal element arranged to sense the temperature of the hot air circulated into contact with the hot tumbling clothes, structure disposed in direct contact with the hot tumbling clothes and having a relatively small thermal mass so that the temperature thereof closely follows that of the hot tumbling clothes, a second thermal element arranged to sense the temperature of said structure, and means governed jointly by said first and second thermal elements for arresting operation of said machine.

2. The clothes drying machine combination set forth in claim 1, wherein said last-mentioned means includes a metering circuit for detecting the point at which the temperature of said structure and consequently the temperature of the hot tumbling clothes rises into close proximity to the temperature of the hot air circulated into contact with the hot tumbling clothes, which point occurs when there is a substantial reduction in the rate of evaporation of moisture from the hot tumbling clothes, whereby this point marks the transition of the clothes from a wet condition carrying a relatively great amount of moisture to a damp-dry condition carrying a relatively small amount of moisture and preceding a bone-dry condition carrying substantially no moisture.

3. In a clothes drying machine that is operative to tumble wet clothes received thereby and to circulate hot air into contact with the wet tumbling clothes so as to effect heating and drying thereof; the combination comprising manually operable means for initiating operation of said machine, a first thermal element arranged to sense the temperature of the hot air circulated into contact with the hot tumbling clothes, structure disposed in direct contact with the hot tumbling clothes and having a relatively small thermal mass so that the temperature thereof closely follows that of the hot tumbling clothes, a second thermal element arranged to sense the temperature of said structure, means for comparing the two temperatures respectively sensed by said two thermal elements named, and means controlled by said comparing means in response to a predetermined comparison of the two temperatures mentioned for arresting operation of said machine.

4. In a clothes drying machine that is operative to tumble and to heat wet clothes received thereby; the combination comprising a program controller operative to effect operation of said machine, manually operable means for initiating operation of said program controller, time-controlled means for arresting operation of said program controller after the expiration of a time interval, a master controller operative to arrest operation of said program controller independently of said time-controlled means, a first thermal element arranged to sense a first relatively high temperature that is directly related to and controlled by the temperature of the hot air in contact with the hot tumbling clothes, a second thermal element arranged to sense a second relatively low temperature that is directly related to and controlled by the temperature of the hot tumbling clothes, and means governed jointly by said first and second thermal elements for operating said master controller.

5. In a clothes drying machine that is operative to tumble and to heat wet clothes received thereby; the combination comprising a program controller operative to effect operation of said machine, manually operable means for initiating operation of said program controller, time-controlled means for arresting operation of said program controller after the expiration of a time interval, a master controller operative to arrest operation of said program controller independently of said time-controlled means, said program controller being operative into a given control condition a fixed time interval after initiation of operation thereof, a first thermal element arranged to sense a first relatively high temperature that is directly related to and controlled by the temperature of the hot air in contact with the hot tumbling clothes, a second thermal element arranged to sence a second relatively low temperature that is directly related to and controlled by the temperature of the hot tumbling clothes, means for comparing the two temperatures respectively sensed by said two thermal elements named, and means controlled jointly by operation of said program controller into its given control condition and by said comparing means in response to a predetermined comparison of the two temperatures mentioned for operating said master controller.

6. In a clothes drying machine that is operative to tumble and to heat wet clothes received thereby; the combination comprising manually operable means for initiating operation of said machine, a first resistor having a high coefficient of resistance and arranged to be heated by the hot air in contact with the hot tumbling clothes, a second resistor having a high coefficient of resistance and arranged to be heated by the hot tumbling clothes, a bridge circuit provided with two arms respectively including said two resistors named, whereby the condition of balance of said bridge circuit is controlled by the resistance difference between said two resistors and consequently by the temperature difference between the two sensings of said two resistors, and means controlled by said bridge circuit and responsive to a predetermined condition of balance thereof for arresting operation of said machine.

7. Apparatus for drying wet fabrics, or the like, comprising a container for receiving the wet fabrics, means including a motor for rotating said container about an axis in order to tumble the wet fabrics therein and to circulate air in said container and into contact with the wet tumbling fabrics therein, a heater operative to heat said container and the air that is circulated therein into contact with the wet tumbling fabrics in said container in order to evaporate moisture from the wet tumbling fabrics therein, a first thermal element arranged in said container and operative to sense the temperature of the hot air in said container that is circulated into contact with the hot tumbling fabrics therein, structure disposed in said container and in direct contact with the hot tumbling fabrics therein and having a relatively small thermal mass so that the temperature thereof closely follows that of the hot tumbling fabrics in said container, a second thermal element disposed in said container and arranged to sense the temperature of said structure, and means governed jointly by said first and second thermal elements for controlling the operation of said heater.

8. A clothes drying machine comprising a drum having a front opening and adapted to receive the wet clothes and mounted for rotation about a substantially horizontal axis in order to tumble the wet clothes therein, a casing enclosing said drum and having a front opening registering with said drum front opening, a front door carried by said casing and movable between open and closed positions with respect to said casing front opening, means including a motor for rotating said drum, a heater operative to heat the wet tumbling clothes in said drum in order to evaporate moisture therefrom, first and second thermal elements carried by said front door and movable therewith through said casing front opening and said drum front opening as said front door is moved between its open and closed positions, whereby said first and second thermal elements occupy respective active and inactive positions when said front door occupies its respective closed and open positions, said first thermal element in its active position being disposed in said drum and operative to sense a first relatively high temperature that is directly related to and controlled by the temperature of the hot air in contact with the hot tumbling clothes in said drum, said second thermal element in its active position being disposed in said drum and operative to sense a second relatively low temperature that is directly related to and controlled by the temperature of the hot tumbling clothes in said drum, and means governed jointly by said first and second thermal elements for controlling the operation of said heater.

9. A clothes drying machine comprising a drum having a front opening and adapted to receive the wet clothes and mounted for rotation about a substantially horizontal axis in order to tumble the wet clothes therein, a casing enclosing said drum and having a front opening registering with said drum front opening, a front door carried by said casing and movable between open and closed positions with respect to said casing front opening, means including a motor for rotating said drum, a heater operative to heat the wet tumbling clothes in said drum in order to evaporate moisture therefrom, structure carried by said front door and movable therewith through said casing front opening and said drum front opening as said front door is moved between its open and closed positions, whereby said structure occupies respective active and inactive positions when said front door occupies its respective closed and open positions, said structure in its active position being disposed in said drum and accommodating the circulation therethrough of the hot air in contact with the hot tumbling clothes in said drum, a thermal element carried by said structure and arranged in heat exchange relation with the hot air circulated therethrough and operative to sense the temperature thereof, and means including said thermal element for controlling the operation of said heater.

10. A clothes drying machine comprising a drum having a front opening and adapted to receive the wet clothes and mounted for rotation about a substantially horizontal axis in order to tumble the wet clothes therein, a casing enclosing said drum and having a front opening registering with said drum front opening, a front door carried by said casing and movable between open and closed positions with respect to said casing front opening, means including a motor for rotating said drum, a heater operative to heat the wet tumbling clothes in said drum in order to evaporate moisture therefrom, structure carried by said front door and movable therewith through said casing front opening and said drum front opening as said front door is moved between its open and closed positions, whereby said structure occupies respective active and inactive positions when said front door occupies its respective closed and open positions, said structure in its active position being disposed in said drum and arranged in heat-exchange relation with the hot tumbling clothes therein, a thermal element carried by said structure and arranged in heat-exchange relation therewith and operative to sense the temperature thereof, and means including said thermal element for controlling the operation of said heater.

11. A clothes drying machine comprising a drum having a front opening and adapted to receive the wet clothes and mounted for rotation about a substantially horizontal axis in order to tumble the wet clothes therein, a casing enclosing said drum and having a front opening registering with said drum front opening, a front door carried by said casing and movable between open and closed positions with respect to said casing front opening, means including a motor for rotating said drum, a heater operative to heat the wet tumbling clothes in said drum in order to evaporate moisture therefrom, structure carried by said front door and movable therewith through said casing front opening and said drum front opening as said front door is moved between its open and closed positions, whereby said structure occupies respective active and inactive positions when said front door occupies its respective closed and open positions, said srtucture in its active position projecting from said front door rearwardly into the interior of said drum and into heat-exchange relation with the hot clothes tumbling therein, the exterior surface of said structure being smooth and of such configuration that there is no substantial interference thereby with the general toroidal formation of the hot tumbling clothes in said drum, a thermal element carried by said structure and arranged in heat-exchange relation therewith and operative to sense the temperature thereof, and means including said thermal element for controlling the operation of said heater.

12. The clothes drying machine set forth in claim 11, wherein said structure is of substantially tubular form and in its active position projects from said front door rearwardly into the interior of said drum and into the interior of the general toroidal formation of the hot tumbling clothes therein.

13. The clothes drying machine set forth in claim 12, wherein said structure in its active position is located somewhat above the axis of rotation of said drum and somewhat laterally offset with respect thereto on the descending side of the general toroidal formation of the hot tumbling clothes therein, so that the exterior surface of said tubular structure is wiped by the hot clothes in the descending side of the toroidal formation thereof.

14. The clothes drying machine set forth in claim 11, wherein said structure is of substantially frusto-conical form and in its active position projects from said front door rearwardly into the interior of said drum and into the interior of the general toroidal formation of the hot tumbling clothes therein and the base of said structure is disposed adjacent to said front door.

15. The clothes drying machine set forth in claim 11, wherein said structure includes inner and outer substantially frusto-conical members arranged in nested spaced-apart relation and defining a substantially frusto-conical air passage therebetween and in its active position projects from said front door rearwardly into the interior of said drum and into the interior of the general toroidal formation of the hot tumbling clothes therein and the base of said structure is disposed adjacent to said front door, and wherein said thermal element is carried in a well formed in the interior surface of said outer member in heat-exchange relation therewith.

16. Apparatus for drying wet fabrics, or the like, comprising a container for receiving the wet fabrics, a motor operative to rotate said container about an axis in order to tumble the wet fabrics therein, a heater operative to heat the wet tumbling fabrics in said container in order to evaporate moisture therefrom, a program controller having an off position and a variable on position, manually operable means for selectively setting said program controller from its off position into its variable on position, a timer operative to return said program controller from its setting in its variable on position back into its off position in a corresponding variable time interval, a control circuit governed by said program controller and responsive to setting thereof into its variable on position for initiating operation of said motor and said heater and said timer and responsive to return thereof into its off position for arresting operation of said motor and said heater and said timer, a thermal element arranged to sense a temperature that is directly related to the temperature of the hot tumbling fabrics in said container, and a master controller governed by said thermal element for arresting operation of said motor and said heater independently of the return of said program controller back into its off position.

17. Apparatus for drying wet fabrics, or the like, comprising a container for receiving the wet fabrics, a motor operative to rotate said container about an axis in order to tumble the wet fabrics therein, a heater operative to heat the wet tumbling fabrics in said container in order to evaporate moisture therefrom, a program controller having an off position and a variable on position, manually operable means for selectively setting said program controller from its off position into its variable on position, a timer operative to return said program controller from its setting in its variable on position back into its off position in a corresponding variable time interval, a control circuit governed by said program controller and responsive to setting thereof into its variable on position for initiating operation of said motor and said heater and said timer and responsive to return thereof into its off position for arresting operation of said motor and said heater and said timer, a master controller operative to arrest operation of said motor and said heater independently of the return of said program controller back into its off position, a thermal element arranged to sense a temperature that is directly related to the temperature of the hot tumbling fabrics in said container, means governed by said thermal element for operating said master controller, a signal, and means governed by operation of said master controller for operating said signal.

18. The apparatus set forth in claim 17, wherein said signal comprises both visual and audible components.

19. Apparatus for drying wet fabrics, or the like, comprising a container for receiving the wet fabrics, a motor operative to rotate said container about an axis in order to tumble the wet fabrics therein, a heater operative to heat the wet tumbling fabrics in said container in order to evaporate moisture therefrom, a program controller having an off position and a variable on position, manually operable means for selectively setting said program controller from its off position into its variable on position, a timer operative to return said program controller from its setting in its variable on position back into its off position in a corresponding variable time interval, a control circuit governed by said program controller and responsive to setting thereof into its variable on position for initiating operation of said motor and said heater and said timer and responsive to return thereof into its off position for arresting operation of said motor and said heater and said timer, a thermal element arranged to sense a temperature that is directly related to the temperature of the hot tumbling fabrics in said container, a master controller having set and trip positions, means responsive to setting of said program controller into its variable on position for operating said master controller into its set position, means governed by said thermal element for operating said master controller into its trip position, and interlock means for positively preventing operation of said motor and said heater when said master controller occupies its trip position.

20. Apparatus for drying wet fabrics, or the like, comprising a container for receiving the wet fabrics, a motor operative to rotate said container about an axis in order to tumble the wet fabrics therein, a heater operative to heat the wet tumbling fabrics in said container in order to evaporate moisture therefrom, a program controller having on and off positions, manually operable means for setting said program controller from its off position into its on position, a timer operative to return said program controller from its on position back into its off position to define a composite cycle including a primary cycle of a first time interval and a secondary cycle of a second time interval, a control circuit governed by said program controller and responsive to setting thereof into its on position for initiating operation of said motor and said heater and said timer and responsive to return thereof into its off position for arresting operation of said motor and said heater and said timer, means governed by said program controller in its primary cycle for controlling the operation of said heater to produce heat at a relatively high heating rate and governed by said program controller in its secondary cycle for controlling the operation of said heater to produce heat at a relatively low heating rate, a thermal element arranged to sense a temperature that is directly related to the temperature of the hot tumbling fabrics in said container, a master controller operative to arrest operation of said motor and said heater independently of the return of said program controller back into its off position, and means governed jointly by said program controller in its secondary cycle and by said thermal element for operating said master controller.

21. Apparatus for drying wet fabrics, or the like, comprising a container for receiving the wet fabrics, a motor operative to rotate said container about an axis in order to tumble the wet fabrics therein, a heater operative to heat the wet tumbling fabrics in said container in order to evaporate moisture therefrom, a program controller having on and off positions, manually operable means for setting said program controller from its off position into its on position, a timer operative to return said program controller from its on position back into its off position to define a composite cycle including a primary cycle of a first time interval and a secondary cycle of a second time interval, a control circuit governed by said program controller and responsive to setting thereof into its on position for initiating operation of said motor and said heater and said timer and responsive to return thereof into its off position for arresting operation of said motor and said heater and said timer a thermal element arranged to sense a temperature that is directly related to the temperature of the hot tumbling fabrics in said container, a manually operable cycle controller having a bone-dry position disabling said thermal element and a damp-dry position enabling said thermal element, and a master controller governed by said thermal element only when enabled for arresting operation of said motor and said heater independently of the return of said program controller back into its off position.

22. Apparatus for drying wet fabrics, or the like, comprising a container for receiving the wet fabrics, a motor operative to rotate said container about an axis in order to tumble the wet fabrics therein, a heater operative to heat the wet tumbling fabrics in said container in order to evaporate moisture therefrom, a program controller having on and off positions, manually operable means for setting said program controller from its off position into its on position, a timer operative to return said program controller from its on position back into its off position to define a composite cycle including a primary cycle of a first time interval and a secondary cycle of a second time interval, a control circuit governed by said program controller and responsive to setting thereof into its on position for initiating operation of said motor and said heater and said timer and responsive to return thereof into its off position for arresting operation of said motor and said heater and said timer a thermal element arranged to sense a temperature that is directly related to the temperature of the hot tumbling fabrics in said container, a manually operable cycle controller having a bone-dry position disabling said thermal element, and a damp-dry position enabling said thermal element, and a master controller governed jointly by said program controller in its secondary cycle and by said thermal element only when enabled for arresting operation of said motor and said heater independently of the return of said program controller back into its off position.

23. Apparatus for drying wet fabrics, or the like, comprising a container for receiving the wet fabrics, a motor operative to rotate said container about an axis in order to tumble the wet fabrics therein, a heater operative to heat the wet tumbling fabrics in said container in order to evaporate moisture therefrom, a program controller having on and off positions, manually operable means for setting said program controller from its off position into its on position, a timer operative to return said program controller from its on position back into its off position to define a composite cycle including a primary cycle of a first time interval and a secondary cycle of a second time interval, a control circuit governed by said program controller and responsive to setting thereof into its on position for initiating operation of said motor and said heater and said timer and responsive to return thereof into its off position for arresting operation of said motor and said heater and said timer, and means governed by said program controller in its primary cycle for controlling the operation of said heater to produce heat at a relatively high heating rate and governed by said program controller in its secondary cycle for controlling the operation of said heater to produce heat at a relatively low heating rate.

24. The apparatus set forth in claim 23, wherein the relatively high heating rate of said heater is variable and the relatively low heating rate of said heater is fixed, and further comprising additional manually operable means for selectively setting the relatively high heating rate of said heater.

25. Apparatus for drying wet fabrics, or the like, comprising a container for receiving the wet fabrics, a motor operative to rotate said container about an axis in order to tumble the wet fabrics therein, a heater operative to heat the wet tumbling fabrics in said container in order to evaporate moisture therefrom, a program controller having an off position and a variable on position, manually operable means for selectively setting said program controller from its off position into its variable on position, a timer operative to return said program controller from its variable on position back into its off position to define a composite cycle including a primary cycle of a fixed time interval and a secondary cycle of a variable time interval, a control circuit governed by said program controller and responsive to setting thereof into its variable on position for initiating operation of said motor and said heater and said timer and responsive to return thereof into its off position for arresting operation of said motor and said heater and said timer, and means governed by said program controller in its primary cycle for controlling the operation of said heater to produce heat at a relatively high heating rate and governed by said program controller in its secondary cycle for controlling the operation of said heater to produce heat at a relatively low heating rate.

26. Apparatus for drying wet fabrics, or the like, comprising a container for receiving the wet fabrics, a motor operative to rotate said container about an axis in order to tumble the wet fabrics therein, a source of electric power, an electric heating unit for heating the wet tumbling fabrics in said container in order to evaporate moisture therefrom, a program controller having on and off positions, manually operable means for setting said program controller from its off position into its on position, a timer operative to return said program controller form its on position back into its off position to define a composite cycle including a primary cycle of a first time interval and a secondary cycle of a second time interval, a control circuit governed by said program controller and responsive to setting thereof into its on position for initiating operation of said motor and said timer and responsive to return thereof into its off position for arresting operation of said motor and said timer, and switching means governed by said program controller in its primary cycle for completing a first heating connection between said source and said heating unit and governed by said program controller in its secondary cycle for completing a second heating connection between said source and said heating unit, said heating unit producing heat at a relatively high rate in said first heating connection and producing heat at a relatively low rate in said second heating connection.

27. The apparatus set forth in claim 26, and further comprising a manually settable thermostatic switch selectively controlled by a temperature related to that of the hot tumbling fabrics in said container and commonly included in said first and second heating connections, said thermostatic switch being operated from its closed position into its open position in response to a relatively high control temperature and operated from its open position into its closed position in respnse to a relatively low control temperature.

28. A clothes drying machine comprising a drum adapted to receive the wet clothes and mounted for rotation about a substantially horizontal axis in order to tumble the wet clothes therein, a casing enclosing said drum and communicating with the interior thereof, a heater arranged in one portion of said casing and operatively associated with said drum to heat the wet tumbling clothes therein in order to evaporate moisture therefrom and into the air communicating between the interior of said drum and said casing, a conduit for introducing cool water into another portion of said casing in order to condense the moisture from the air therein, a normally closed valve arranged in said conduit for controlling the introduction of the cool water into said casing, a drain communicating with the bottom of said casing and arranged to accumulate the water and the condensate therein, a pump operative to remove to the exterior the water and the condensate accumulating in said drain, a motor operative to rotate said drum and to operate said pump, a program controller having on and off positions, manually operable means for setting said program controller from its off position into its on position, a timer operative to return said program controller from its on position back into its off position to define a composite cycle including a primary cycle of a first time interval and a secondary cycle of a second time interval, a control circuit governed by said program controller and responsive to setting thereof into its on position for initiating operation of said motor and said heater and said timer and for operating said valve into its open position and responsive to return thereof into its off position for arresting operation of said motor and said heater and said timer and for operating said valve into its closed position, and means governed by said program controller in its primary cycle for controlling the operation of said heater to produce heat at a relatively high heating rate and governed by said program controller in its secondary cycle for controlling the operation of said heater to produce heat at a relatively low heating rate.

29. Apparatus for drying wet fabrics, or the like, comprising a container for receiving the wet fabrics, a motor operative to rotate said container about an axis in order to tumble the wet fabrics therein, a heater operative to heat the wet tumbling fabrics in said container in order to evaporate moisture therefrom, a program controller having on and off positions, manually operable means for setting said program controller from its off position into its on position, a timer operative to return said program controller from its on position back into its off position to define a composite cycle including a primary cycle of a first time interval and a secondary cycle of a second time interval, a control circuit governed by said program controller and responsive to setting thereof into its on position for initiating operation of said motor and said heater and said timer and responsive to return thereof into its off position for arresting operation of said motor and said heater and said timer, a manually operable cycle controller having a reduced-heat position and a full-heat position, first means governed by said program controller in its primary cycle for controlling the operation of said heater to produce heat at a relatively high heating rate, second means governed jointly by said program controller in its secondary cycle and by said cycle controller in its reduced-heat position for controlling the operation of said heater to produce heat at a relatively low heating rate, and third means governed jointly by said program controller in its secondary cycle and by said cycle controlled in its full-heat position for controlling the operation of said heater to produce heat at said relatively high heating rate.

30. Apparatus for drying wet fabrics, or the like, comprising a container for receiving the wet fabrics, a motor operative to rotate said container about an axis in order to tumble the wet fabrics therein, a heater operative to heat the wet tumbling fabrics in said container in order to evaporate moisture therefrom, a program controller having on and off positions, manually operable means for setting said program controller from its off position into its on position, a timer operative to return said program controller from its on position back into its off position to define a composite cycle including a primary cycle of a first time interval and a secondary cycle of a second time interval, a control circuit governed by said program controller and responsive to setting thereof into its on position for initiating operation of said motor and said heater and said timer and responsive to return thereof into its off position for arresting operation of said motor and said heater and said timer, a manually operable cycle controller having a first or bone-dry and reduced-heat position and a second or bone-dry and full-heat position and a third or damp-dry position, first means governed by said program controller in its primary cycle for controlling the operation of said heater to produce heat at a relatively high heating rate, second means governed jointly by said program controller in its secondary cycle and by said cycle controller in its first position for controlling the operation of said heater to produce heat at a relatively low heating rate, third means governed jointly by said program controller in its secondary cycle and by said cycle controller in its second position for controlling the operation of said heater to produce heat at said relatively high heating rate, a master controller operative to arrest operation of said motor and said heater independently of the return of said program controller back into its off position, a thermal element arranged to sense a temperature that is directly related to the temperature of the hot tumbling fabrics in said container, and fourth means governed jointly by said program controller in its secondary cycle and by said cycle controller in its third position and by said thermal element for operating said master controller.

31. In a clothes drying machine, a container for receiving wet clothes to be dried, means for rotating said container in order to tumble the wet clothes therein and for circulating air through said container and into contact with the wet tumbling clothes therein, a heating device operative to heat and container and the air circulated therethrough and into contact with the wet tumbling clothes therein, means for initiating operation of said heating device, a first thermal responsive element for sensing the relatively high temperature of the hot air that is circulated through said container into contact with the tumbling clothes therein, a second thermal responsive element for sensing the relatively low temperature of the tumbling clothes in said container, a detector operative to detect the difference between the temperature sensed by said first thermal responsive element and the temperature sensed by said second thermal responsive element, means controlled a fixed time interval after said initiation of operation of said heating device for initiating operation of said detector, whereby substantially a minimum temperature difference is detected by said detector when the hot tumbling clothes in said container are in substantially a damp-dry condition, and means governed by said detector in response to the detection thereby of a fixed and substantially minimum temperature difference for arresting operation of said heating device.

32. In a clothes drying machine, a container for receiving wet clothes to be dried, means for rotating said container in order to tumble the wet clothes therein and for circulating air through said container and into contact with the wet tumbling clothes therein, a heating device operative to heat said container and the air circulated therethrough and into contact with the wet tumbling clothes therein, means for initiating operation of said heating device to produce heat at a relatively high rate, means controlled a fixed time interval after said initiation of operation of said heating device for altering the operation thereof to produce heat at a relatively low rate, a first thermal responsive element for sensing the relatively high temperature of the hot air that is circulated through said container into contact with the tumbling clothes therein, a second thermal responsive element for sensing the relatively low temperature of the tumbling clothes in said container, a detector operative to detect the difference between the temperature sensed by said first thermal responsive element and the temperature sensed by said second thermal responsive element, means controlled a fixed time interval after said alteration of operation of said heating device for initiating operation of said detector, whereby substantially a minimum temperature difference is detected by said detector when the hot tumbling clothes in said container are in substantially a damp-dry condition, and means governed by said detector in response to the detection thereby of a fixed and substantially minimum temperature difference for arresting operation of said heating device.

33. The clothes drying machine set forth in claim 32, wherein said fixed and substantially minimum temperature difference is about 1° F. to 2° F.

34. In a clothes drying machine, a container for receiving wet clothes to be dried, a casing enclosing said container, means for rotating said container in order to tumble the wet clothes therein and for circulating air through said container and into contact with the wet clothes tumbling therein and then through a zone in said casing disposed exteriorly of said container and thence back into said container, a heating device operative to heat said container and the air circulated therethrough and into contact with the wet tumbling clothes therein, a cooling device operative to cool the hot air circulated through said zone in said casing, means for initiating operation of both said heating device and said cooling device, a first thermal responsive element for sensing the relatively high temperature of the hot air that is circulated through said container into contact with the tumbling clothes therein, a second thermal responsive element for sensing the relatively low temperature of the tumbling clothes in said container, a detector operative to detect the difference between the temperature sensed by said first thermal responsive element and the temperature sensed by said second thermal responsive element, means controlled a fixed time interval after said initiation of operation of said heating device for initiating operation of said detector, whereby substantially a minimum temperature difference is detected by said detector when the hot tumbling clothes in said container are in substantially a damp-dry condition, means governed by said detector in response to the detection thereby of a fixed and substantially minimum temperature difference for arresting operation of said heating device, and means controlled a fixed time interval after said arresting of operation of said heating device for arresting operation of said cooling device.

References Cited in the file of this patent

UNITED STATES PATENTS

| | | |
|---|---|---|
| 1,567,710 | Carroll | Dec. 29, 1925 |
| 2,316,208 | Woodruff | Apr. 13, 1943 |
| 2,346,437 | Krogh | Apr. 11, 1944 |
| 2,391,195 | Ross et al. | Dec. 18, 1945 |
| 2,403,630 | Blunk et al. | July 9, 1946 |
| 2,720,037 | Erickson | Oct. 11, 1955 |
| 2,743,532 | Steward | May 1, 1956 |

UNITED STATES PATENT OFFICE

CERTIFICATE OF CORRECTION

Patent No. 2,885,789 May 12, 1959

Donald R. Conkling et al.

It is hereby certified that error appears in the printed specification of the above numbered patent requiring correction and that the said Letters Patent should read as corrected below.

Column 29, line 41, for "controlled" read -- controller --; column 30, line 15, for "and", first occurrence, read -- said --.

Signed and sealed this 13th day of October 1959.

(SEAL)
Attest:

KARL H. AXLINE
Attesting Officer

ROBERT C. WATSON
Commissioner of Patents